United States Patent [19]

Sant

[11] Patent Number: 5,877,251

[45] Date of Patent: *Mar. 2, 1999

[54] CARBON BLACKS AND COMPOSITIONS INCORPORATING THE CARBON BLACKS

[75] Inventor: Ravindra Sant, Pampa, Tex.

[73] Assignee: Cabot Corporation, Boston, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 787,455

[22] Filed: Jan. 22, 1997

Related U.S. Application Data

[63] Continuation of Ser. No. 595,037, Jan. 31, 1996.

[51] Int. Cl.$^6$ ................ C08K 3/04; C09C 1/48
[52] U.S. Cl. ............ 524/496; 524/495; 423/445 R; 423/449.1; 523/215
[58] Field of Search ................ 524/496, 495; 423/449.1, 445, 445 R; 523/215

[56] References Cited

U.S. PATENT DOCUMENTS

| | | | |
|---|---|---|---|
| 3,799,788 | 3/1974 | Jordan et al. ............ | 106/307 |
| 3,864,305 | 2/1975 | Jordan et al. . | |
| 3,922,335 | 11/1975 | Jordan et al. ............ | 423/450 |
| 3,925,301 | 12/1975 | Engel et al. . | |
| 3,952,087 | 4/1976 | Antonsen et al. . | |
| 4,035,336 | 7/1977 | Jordan et al. . | |
| 4,154,808 | 5/1979 | Rothbuhr et al. . | |
| 4,315,902 | 2/1982 | Dilbert . | |
| 4,366,138 | 12/1982 | Eisenmenger et al. . | |
| 4,421,891 | 12/1983 | Miyake et al. . | |
| 4,500,672 | 2/1985 | Suzuki et al. . | |
| 4,518,733 | 5/1985 | Ishikawa et al. . | |
| 4,540,560 | 9/1985 | Henderson et al. . | |
| 4,629,758 | 12/1986 | Kawaguchi et al. . | |
| 4,645,657 | 2/1987 | Lee et al. . | |
| 4,678,830 | 7/1987 | Sato et al. . | |
| 4,684,687 | 8/1987 | Breach et al. ............ | 524/291 |
| 4,784,695 | 11/1988 | Mito et al. . | |
| 4,808,395 | 2/1989 | Yoshimura et al. . | |
| 4,822,844 | 4/1989 | Kawakami et al. . | |
| 4,835,209 | 5/1989 | Kawakami et al. ............ | 529/459 |
| 4,879,104 | 11/1989 | List et al. . | |
| 4,946,887 | 8/1990 | Takino et al. ............ | 524/495 |
| 5,025,059 | 6/1991 | Mouri et al. . | |
| 5,132,357 | 7/1992 | Endter et al. . | |
| 5,190,739 | 3/1993 | MacKay et al. . | |
| 5,200,164 | 4/1993 | Medalia et al. . | |
| 5,212,226 | 5/1993 | Soeda et al. . | |
| 5,229,452 | 7/1993 | Green et al. . | |
| 5,232,974 | 8/1993 | Branan, Jr. et al. . | |
| 5,288,788 | 2/1994 | Shieh et al. . | |
| 5,310,777 | 5/1994 | Sekido et al. . | |
| 5,358,782 | 10/1994 | Parish . | |
| 5,382,621 | 1/1995 | Laube . | |
| 5,385,768 | 1/1995 | Otani et al. . | |
| 5,430,086 | 7/1995 | Saito et al. . | |
| 5,430,087 | 7/1995 | Carlson et al. . | |
| 5,456,750 | 10/1995 | Mackay et al. . | |
| 5,484,836 | 1/1996 | Kikuchi et al. . | |
| 5,554,679 | 9/1996 | Cheng . | |

FOREIGN PATENT DOCUMENTS

| | | | |
|---|---|---|---|
| 0 159 469 A1 | 10/1985 | European Pat. Off. .......... | B60C 1/00 |
| 0 334 992 | 10/1989 | European Pat. Off. .......... | H01B 1/24 |
| 0 384 080 A2 | 8/1990 | European Pat. Off. .......... | C09C 1/50 |
| 2 652 586 | 4/1991 | France ............ | C09C 1/48 |
| 4252286 | 9/1992 | Japan ............ | C09K 3/10 |

OTHER PUBLICATIONS

Table 1 of ASTM Standard D1765.
Page 113 from *Carbon Black Science and Technology*, 2nd Ed., edited by Donnet et al., © 1993 (plus Title pages).
*Annual Book of ASTM Standards*, vol. 09.01, Philadelphia, pp. 270–275, "Standard Test Method for Carbon Black–Iodine Adsorption Number".
Notification of Transmittal of the International Search Report or the Declaration and International Search Report mailed Jun. 20, 1997.

*Primary Examiner*—Vasu Jagannathan
*Assistant Examiner*—Olga Asinovsky

[57] ABSTRACT

New classes of carbon blacks which may be broadly characterized as having an Iodine adsorption number ($I_2$No.) of 50–112 milligrams/gram (mg/g) and a primary particle size measured in accordance with the procedures in ASTM Test Procedure D3849-89 (hereinafter denoted as "primary particle size") of less than or equal to 25 nanometers (nm). Certain of the carbon blacks of the present invention may be further characterized as having a CDBP (dibutyl absorption value of the crushed carbon black) of less than or equal to 102 cubic centimeters DBP per 100 grams of carbon black (cc/100 g). The present invention provides carbon blacks having $I_2$No. of 65–95 mg/g and a primary particle size of less than or equal to 20 nm. Also disclosed and claimed are carbon blacks having an $I_2$No. of 100–112 mg/g and a primary particle size of less than or equal to 20 nm. The present invention further provides carbon blacks having an $I_2$No. of 65–112 mg/g; a primary particle size of less than or equal to 20 nanometers (nm); and a CDBP (dibutyl absorption value of the crushed carbon black) of less than or equal to 102 cubic centimeters DBP per 100 grams of carbon black (cc/100 g). In addition, carbon blacks having an $I_2$No. of 50–70 milligrams/gram (mg/g) and a primary particle size of less than or equal to 25 nm, are disclosed and claimed. The present invention also provides carbon blacks having an $I_2$No. of 50–85 mg/g; a primary particle size of less than or equal to 25 nm; and a CDBP of less than or equal to 96 cc/100 g. The carbon blacks are particularly well suited for use in the production of polymer compositions. Also described and claimed are polymer compositions incorporating the new carbon blacks.

67 Claims, 5 Drawing Sheets

CARBON BLACKS AND COMPOSITIONS INCORPORATING THE CARBON BLACKS

This application is a continuation of application Ser. No. 08/595,037, filed on Jan. 31, 1996.

FIELD OF THE INVENTION

The present invention relates to a class of new and useful carbon blacks which are suitable for various applications and particularly well suited for use in natural rubbers, synthetic rubbers, elastomers, plastomers and/or blends or mixtures thereof. The present invention also relates to new and useful polymer compositions (natural rubbers, synthetic rubbers, elastomers, plastomers, and/or blends or mixtures thereof) which include the carbon blacks.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers and/or reinforcing agents in polymer compositions. As used herein "polymer" refers to a natural rubber, a synthetic rubber, an elastomer, a plastomer and/or blends or mixtures thereof.

Carbon blacks may also be utilized to impart electrical conductivity and protection from ultraviolet (UV) degradation to polymer compositions. For example, carbon blacks are widely used to minimize the degradation of polymer compositions upon exposure to UV radiation. Such UV radiation occurs as a component of natural sunlight. It is generally recognized that the degree of protection from UV degradation is improved upon use of carbon blacks having a reduced particle size, for example no greater than 25 nanometers (nm.). There is generally believed to be additional benefits from the use of carbon blacks having particle sizes no greater than 20 nm.

Carbon blacks are incorporated into the polymer composition through a variety of mixing techniques. For carbon blacks which have acceptable characteristics relating to UV protection, it is generally desirable to utilize those carbon blacks which will provide as low a viscosity as possible, and thus improve the processability of the carbon black-polymer composition mixture. Another desirable feature of carbon blacks used in such applications would be to maximize, to the extent practicable, the relative content of carbon black in the carbon black-polymer composition mixture. In order to minimize the tendency of a plastic composition to absorb moisture, it is desirable to utilize carbon blacks which possess as low a compound moisture absorption (CMA) as possible. The CMA is indicative of the moisture absorption capability of the carbon black after it has been compounded into the polymer composition of interest.

Accordingly, it would be advantageous to produce novel carbon blacks which impart improved viscosity or processability characteristics to polymer compositions into which the carbon blacks are incorporated.

It would also be advantageous to produce novel carbon blacks which impart lower compound moisture absorption characteristics to polymer compositions into which the carbon blacks are incorporated.

Further, it would be advantageous to have novel polymer compositions which have improved viscosity and/or processability characteristics, and lower compound moisture absorption.

These and other advantages are achieved by the carbon blacks and polymer compositions of the present invention.

SUMMARY OF INVENTION

The present invention provides new classes of carbon blacks which may be characterized as having an Iodine adsorption number ($I_2$No.) of 50–112 milligrams/gram (mg/g) and a primary particle size measured in accordance with the procedures in ASTM Test Procedure D3849-89 (hereinafter denoted as "primary particle size") of less than or equal to 25 nanometers (nm). Certain of the carbon blacks of the present invention may be further characterized as having a CDBP (dibutyl absorption value of the crushed carbon black) of less than or equal to 102 cubic centimeters DBP per 100 grams of carbon black (cc/100 g), measured in accordance with ASTM Test Procedure D3493-86.

In particular, the present invention provides new carbon blacks having an $I_2$No. of 65–95 mg/g and a primary particle size of less than or equal to 20 nm. Preferably, the carbon blacks have an $I_2$ No. of 73–94 mg/g and/or a primary particle size of less than or equal to 19 nm. More preferably, the carbon blacks have an $I_2$ No. of 85–93 mg/g and/or a primary particle size of less than or equal to 19 nm.

The present invention also provides new carbon blacks having an $I_2$No. of 100–112 mg/g and a primary particle size of less than or equal to 20 nm. Preferably the carbon blacks have a primary particle size of less than or equal to 19 nm.

The present invention further provides new carbon blacks having an $I_2$No. of 65–112 mg/g; a primary particle size of less than or equal to 20 nm; and a CDBP of less than or equal to 102 cc/100 g. Preferably, the carbon blacks have an $I_2$ No. of 73–104 mg/g; a primary particle size of less than or equal to 19 nm; and/or a CDBP of 70–100 cc/100 g. More preferably, the carbon blacks have an $I_2$ No. of 75–99 mg/g; a primary particle size of less than or equal to 19 nm; and/or a CDBP of 80–95 cc/100 g.

In addition, the present invention provides new carbon blacks having an $I_2$No. of 50–70 mg/g and a primary particle size of less than or equal to 25 nm. Preferably, the carbon blacks have an $I_2$ No. of 55–65 mg/g and/or a primary particle size of from greater than 20 nm to 25 nm.

Further, the present invention provides new carbon blacks having an $I_2$No. of 50–85 mg/g; a primary particle size of less than or equal to 25 nm; and a CDBP of less than or equal to 96 cc/100 g. Preferably, the carbon blacks have an $I_2$ No. of 55–80 mg/g; a primary particle size of from greater than 20 nm to 25 nm; and/or a CDBP of 50–96 cc/100 g. More preferably, the carbon blacks have an $I_2$ No. of 60–78 mg/g; a primary particle size of from greater than 20 nm to 25 nm; and/or a CDBP of 50–96 cc/100 g.

In addition, the present invention provides polymer compositions which incorporate the carbon blacks of the present invention. As used herein "polymer" refers broadly to any natural rubber, synthetic rubber, elastomer, plastomer and/or blends or mixtures thereof.

The carbon blacks of the present invention may be produced by any process known in the art. Preferably the carbon blacks of the present invention are produced in a furnace carbon black reactor having a first (combustion) zone, a transition zone, and a reaction zone wherein:

a carbon black-yielding feedstock is injected into a hot combustion gas stream;

the resultant mixture of hot combustion gases and feedstock passes into the reaction zone; and pyrolysis of the carbon black-yielding feedstock is stopped by quenching the mixture when the carbon blacks of the present invention have been formed and wherein there is utilized a primary combustion level of greater than 300%, preferably at least 550%, more preferably 650–1200%. Preferably the overall combustion level of the process for producing the carbon blacks of the present invention is at least 22%, preferably 22% to 35%, more preferably 25% to 28%. It is also preferred that the residence time for the carbon black forming reactions in the process for producing the carbon blacks of the present invention is 0.55 second to 9.9 seconds, more preferably 1.06 seconds to 8.01 seconds. The process for preparing the novel carbon blacks of the present invention will be described in greater detail hereinafter.

The polymer compositions of the present invention include natural rubbers, synthetic rubbers, elastomers, plastomers, and blends or mixtures thereof. The amount of carbon black utilized in the polymer compositions of the present invention includes any amount effective to achieve the results desired for the intended end use of the polymer composition, such amounts being conventional and well known to those of ordinary skill in the art. Generally, amounts of the carbon black product ranging from 0.5 to 300 parts by weight can be used for each 100 parts by weight of polymer. It is, however, preferred to use amounts varying from 0.5 to 100 parts by weight of carbon black per 100 parts by weight of polymer and especially preferred is the utilization of from 0.5 to 80 parts by weight of carbon black per 100 parts by weight of polymer.

Among the polymers suitable for use with the present invention are natural rubber, synthetic rubber, e.g. polyisoprene and polybutadiene, and their derivatives such as chlorinated rubber; copolymers of from about 10 to about 70 percent by weight of styrene and from about 90 to about 30 percent by weight of butadiene, such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinylpyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene. Preferably the ethylene containing polymer comprises: an ethylene-propylene copolymer or an ethylene-propylene terpolymer. More preferably, the ethylene containing polymer comprises ethylene propylene diene monomer (EPDM). Also preferred is an ethylene containing polymer comprising 0.5 to 98%, by weight, ethylene monomer.

Additionally preferred polymeric compositions are polyolefins such as polypropylene and polyethylene.

Suitable polymers also include:
a) propylene homopolymers, ethylene homopolymers, and ethylene copolymers and graft polymers where the co-monomers are selected from butene, hexene, propene, octene, vinyl acetate, acrylic acid, methacrylic acid, $C_1$–$C_8$ alkyl esters of acrylic acid, $C_1$–$C_8$ alkyl esters of methacrylic acid, maleic anhydride, half ester of maleic anhydride, and carbon monoxide;
b) elastomers selected from natural rubber, polybutadiene, polyisoprene, random or block styrene butadiene rubber (SBR), polychloroprene, acrylonitrile butadiene, ethylene propylene co and terpolymers, ethylene propylene diene monomer (EPDM);
c) homopolymers and copolymers of styrene, including styrene-butadiene styrene linear and radial polymer, acrylonitrile butadiene styrene (ABS) and styrene acrylonitrile (SAN);
d) thermoplastics, including polyethylene terephthalate (PET), polybutylene terephthalate (PBT), polycarbonates, polyamides, polyvinyl chlorides (PVC), acetals; and
e) thermosets, including polyurethane, epoxies and polyesters.

An advantage of the carbon blacks of the present invention is that the carbon blacks impart low viscosity to the polymer compositions into which they are incorporated.

Another advantage of the carbon blacks of the present invention is that the carbon blacks impart low CMA (compound moisture absorption) to the polymer compositions into which they are incorporated.

A further advantage of the carbon blacks of the present invention is that the carbon blacks may be incorporated at high carbon black loadings into polymer compositions.

An advantage of the polymer compositions of the present invention is that the polymer compositions have low viscosity.

Another advantage of the polymer compositions of the present invention is that the polymer compositions have low CMA (compound moisture absorption).

A further advantage of the polymer compositions of the present invention is that the polymer compositions may incorporate high loading levels of carbon black.

Other advantages of the present invention will become apparent from the more detailed description of the invention.

DETAILED DESCRIPTION OF THE INVENTION

Figure 1:
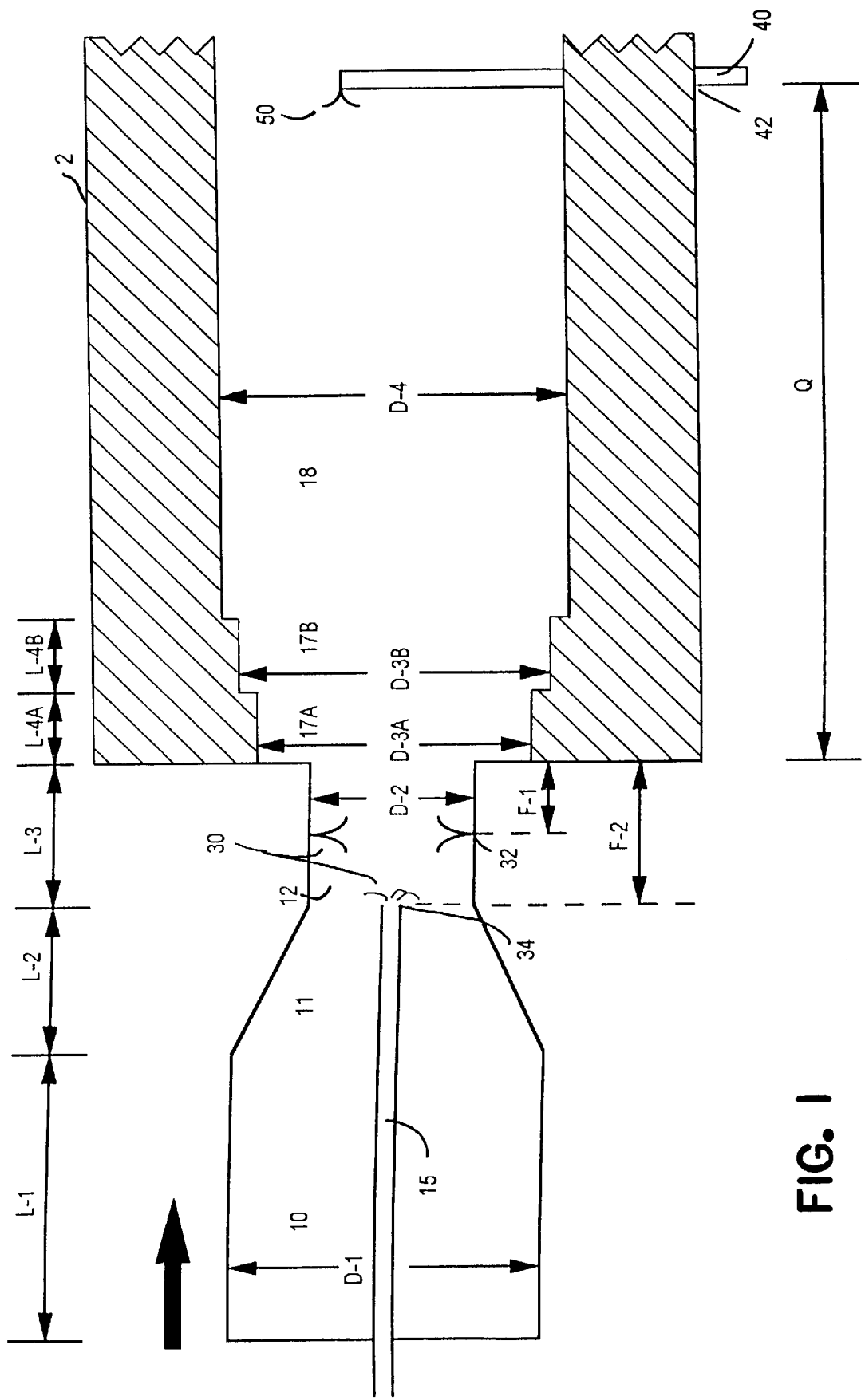
FIG. 1 is a cross-sectional view of a portion of one type of furnace carbon black reactor which may be utilized to produce the carbon blacks of the present invention.

The present invention provides carbon blacks and polymer compositions incorporating the carbon blacks.

In one aspect, the present invention provides a carbon black having: an $I_2$No. of 65–95 mg/g, preferably 73–94 mg/g, more preferably 85–93 mg/g; and a primary particle size of less than or equal to 20 nm, preferably less than or equal to 19 nm. In more detail, these carbon blacks include the following:

1a) a carbon black having an $I_2$No. of 65–95 mg/g and a primary particle size of less than or equal to 20 nm;
2a) a carbon black having an $I_2$No. of 73–94 mg/g and a primary particle size of less than or equal to 20 nm;
3a) a carbon black having an $I_2$No. of 85–93 mg/g and a primary particle size of less than or equal to 20 nm;
4a) a carbon black having an $I_2$No. of 65–95 mg/g and a primary particle size of less than or equal to 19 nm;
5a) a carbon black having an $I_2$No. of 73–94 mg/g and a primary particle size of less than or equal to 19 nm; and
6a) a carbon black having an $I_2$No. of 85–93 mg/g and a primary particle size of less than or equal to 19 nm.

In another aspect, the present invention provides a carbon black having: an $I_2$No. of 100–112 mg/g; and a primary particle size of less than or equal to 20 nm, preferably less than or equal to 19 nm. In more detail, these carbon blacks include the following:

1b) a carbon black having an $I_2$No. of 100–112 mg/g and a primary particle size of less than or equal to 20 nm; and
2b) a carbon black having an $I_2$No. of 100–112 mg/g and a primary particle size of less than or equal to 19 nm.

In a further aspect, the present invention provides a carbon black having: an $I_2$No. of 65–112 mg/g, preferably 73–104 mg/g, more preferably 75–99 mg/g; a primary particle size of less than or equal to 20 nm, preferably less than or equal to 19 nm; and a CDBP of less than or equal to 102 cc/100 g, preferably 70–100 cc/100 g, more preferably 80–95 cc/100 g. In more detail, these carbon blacks include the following:

1c) a carbon black having an $I_2$No. of 65–112 mg/g; a primary particle size of less than or equal to 20 nm; and a CDBP of less than or equal to 102 cc/100 g;
2c) a carbon black having an $I_2$No. of 65–112 mg/g; a primary particle size of less than or equal to 20 nm; and a CDBP of 70–100 cc/100 g;
3c) a carbon black having $I_2$No. of 65–112 mg/g; a primary particle size of less than or equal to 20 nm; and a CDBP of 80–95 cc/100 g;
4c) a carbon black having an $I_2$No. of 65–112 mg/g; a primary particle size of less than or equal to 19 nm; and a CDBP of less than or equal to 102 cc/100 g;
5c) a carbon black having an $I_2$No. of 65–112 mg/g; a primary particle size of less than or equal to 19 nm; and a CDBP of 70–100 cc/100 g;
6c) a carbon black having an $I_2$No. of 65–112 mg/g; a primary particle size of less than or equal to 19 nm; and a CDBP of 80–95 cc/100 g;
7c) a carbon black having an $I_2$No. of 73–104 mg/g; a primary particle size of less than or equal to 20 nm; and a CDBP of less than or equal to 102 cc/100 g;
8c) a carbon black having an $I_2$No. of 73–104 mg/g; a primary particle size of less than or equal to 20 nm; and a CDBP of 70–100 cc/100 g;
9c) a carbon black having $I_2$No. of 73–104 mg/g; a primary particle size of less than or equal to 20 nm; and a CDBP of 80–95 cc/100 g;
10c) a carbon black having an $I_2$No. of 73–104 mg/g; a primary particle size of less than or equal to 19 nm; and a CDBP of less than or equal to 102 cc/100 g;
11c) a carbon black having an $I_2$No. of 73–104 mg/g; a primary particle size of less than or equal to 19 nm; and a CDBP of 70–100 cc/100 g;
12c) a carbon black having $I_2$No. of 73–104 mg/g; a primary particle size of less than or equal to 19 nm; and a CDBP of 80–95 cc/100 g;
13c) a carbon black having an $I_2$No. of 75–99 mg/g; a primary particle size of less than or equal to 20 nm; and a CDBP of less than or equal to 102 cc/100 g;
14c) a carbon black having an $I_2$No. of 75–99 mg/g; a primary particle size of less than or equal to 20 nm; and a CDBP of 70–100 cc/100 g;
15c) a carbon black having $I_2$No. of 75–99 mg/g; a primary particle size of less than or equal to 20 nm; and a CDBP of 80–95 cc/100 g;
16c) a carbon black having an $I_2$No. of 75–99 mg/g; a primary particle size of less than or equal to 19 nm; and a CDBP of less than or equal to 102 cc/100 g;
17c) a carbon black having an $I_2$No. of 75–99 mg/g; a primary particle size of less than or equal to 19 nm; and a CDBP of 70–100 cc/100 g; and
18c) a carbon black having $I_2$No. of 75–99 mg/g; a primary particle size of less than or equal to 19 nm; and a CDBP of 80–95 cc/100 g.

In still another aspect, the present invention provides new carbon blacks having an $I_2$No. of 50–70 mg/g and a primary particle size of less than or equal to 25 nm. Preferably, the carbon blacks have an $I_2$ No. of 55–65 mg/g and/or a primary particle size of from greater than 20 nm to 25 nm. In more detail, these carbon blacks include the following:

1d) a carbon black having an $I_2$No. of 50–70 mg/g and a primary particle size of less than or equal to 25 nm;
2d) a carbon black having an $I_2$No. of 50–70 mg/g and a primary particle size of from greater than 20 nm to 25 nm;
3d) a carbon black having an $I_2$No. of 55–65 mg/g and a primary particle size of less than or equal to 25 nm; and
4d) a carbon black having an $I_2$No. of 55–65 mg/g and a primary particle size of from greater than 20 nm to 25 nm.

In a further aspect, the present invention provides new carbon blacks having an $I_2$No. of 50–85 mg/g; a primary particle size of less than or equal to 25 nm; and a CDBP of less than or equal to 96 cc/100 g. Preferably, the carbon blacks have an $I_2$No. of 55–80 mg/g; a primary particle size of from greater than 20 nm to 25 nm; and/or a CDBP of 50–96 cc/100 g. More preferably, the carbon blacks have an $I_2$ No. of 60–78 mg/g; a primary particle size of from greater than 20 nm to 25 nm; and/or a CDBP of 50–96 cc/100 g. In more detail, these carbon blacks include the following:

1e) a carbon black having an $I_2$No. of 50–85 mg/g; a primary particle size of less than or equal to 25 nm; and a CDBP of less than or equal to 96 cc/100 g;
2e) a carbon black having an $I_2$No. of 55–80 mg/g; a primary particle size of less than or equal to 25 nm; and a CDBP of less than or equal to 96 cc/100 g;
3e) a carbon black having an $I_2$No. of 60–78 mg/g; a primary particle size of less than or equal to 25 nm; and a CDBP of less than or equal to 96 cc/100 g;
4e) a carbon black having an $I_2$No. of 50–85 mg/g; a primary particle size of less than or equal to 25 nm; and a CDBP of 50–96 cc/100 g;
5e) a carbon black having an $I_2$No. of 55–80 mg/g; a primary particle size of less than or equal to 25 nm; and a CDBP of 50–96 cc/100 g;

6e) a carbon black having an $I_2$No. of 60–78 mg/g; a primary particle size of less than or equal to 25 nm; and a CDBP of 50–96 cc/100 g;

7e) a carbon black having an $I_2$No. of 50–85 mg/g; a primary particle size of from greater than 20 nm to 25 nm; and a CDBP of less than or equal to 96 cc/100 g;

8e) a carbon black having an $I_2$No. of 55–80 mg/g; a primary particle size of from greater than 20 nm to 25 nm; and a CDBP of less than or equal to 96 cc/100 g;

9e) a carbon black having an $I_2$No. of 60–78 mg/g; a primary particle size of from greater than 20 nm to 25 nm; and a CDBP of less than or equal to 96 cc/100 g;

10e) a carbon black having an $I_2$No. of 50–85 mg/g; a primary particle size of from greater than 20 nm to 25 nm; and a CDBP of 50–96 cc/100 g;

11e) a carbon black having an $I_2$No. of 55–80 mg/g; a primary particle size of from greater than 20 nm to 25 nm; and a CDBP of 50–96 cc/100 g; and 12e) a carbon black having an $I_2$No. of 60–78 mg/g; a primary particle size of from greater than 20 nm to 25 nm; and a CDBP of 50–96 cc/100 g.

The carbon blacks of the present invention may be produced by any process but are preferably produced in the manner described below. It should be understood however, that although the process for producing the carbon blacks of the present invention is described below with reference to one type of carbon black furnace reactor, the process may be practiced in other types of carbon black reactor.

In particular, the carbon blacks of the present invention may be produced according to the process of the present invention in a modular, also referred to as "staged," furnace carbon black reactor. A section of a typical modular furnace carbon black reactor which may be utilized to produce the carbon blacks of the present invention is depicted in FIG. 1. Other details of a typical modular furnace carbon black reactor may be found, for example, in the description contained in U.S. Pat. No. 3,922,335, the disclosure of which is herein incorporated by reference.

Referring to FIG. 1, the carbon blacks of the present invention may be produced in a furnace carbon black reactor 2, having a combustion zone 10, which has a zone of converging diameter, 11, a transition zone 12, and reaction zone 18. The end of the reaction zone 18 nearest the transition zone 12 has a zone, or zones, 17A and 17B, of a restricted diameter. The diameter of the combustion zone 10, up to the point where the zone of converging diameter 11, begins is shown as D-1; the diameter of zone 12, as D-2; the diameter of zone 17A, as D-3A; the diameter of zone 17B, as D-3B, and the diameter of zone 18, as D-4. The length of the combustion zone 10, up to the point where the zone of converging diameter 11, begins is shown as L-1; the length of the zone of converging diameter, 11, is shown as L-2; the length of the transition zone, 12, is shown as L-3; the length of the zone, 17A, of restricted diameter, is shown as L-4A; and the length of the zone, 17B, of restricted diameter, is shown as L-4B.

To produce the carbon blacks of the present invention, hot combustion gases are generated in combustion zone 10, by reacting a liquid or gaseous fuel with a suitable oxidant such as air, oxygen, mixtures of air and oxygen or the like. Among the fuels suitable for use in reacting with the oxidant stream in combustion zone 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and, in particular, hydrocarbons. The ratio of air to natural gas utilized to produce the carbon blacks of the present invention is at least 30:1, preferably 45:1 to 100:1. To facilitate the generation of hot combustion gases, the oxidant stream may be preheated.

In order to produce the carbon blacks of the present invention, the primary combustion level of the carbon black production process is greater than 300% and preferably at least 550%. More preferably, to produce the carbon blacks of the present invention, the primary combustion level of the carbon black production process is 650–1200%.

As referred to herein, the primary combustion level represents the amount of oxidant such as air used in the first stage of a multi-staged process relative to the theoretical amount of oxidant required for the complete combustion of the first stage hydrocarbon to carbon dioxide and water. For purposes of convenience, the primary combustion level is expressed in terms of a percentage.

The theoretical amount of oxidant required for the complete combustion of the first stage hydrocarbon to carbon dioxide and water is referred to herein as the "Air-to-burn-Gas Ratio", and expressed as a ratio of volumes of theoretical oxidant and first stage hydrocarbon. The quantities of oxidant and first stage hydrocarbon may be described in any convenient and consistent set of units.

The primary combustion level may be determined according to the following formula:

$$\text{Primary Combustion Level, \%} = \frac{\text{(Measured Air Rate)} \times 100}{\text{(Measured Gas Rate)} \times \text{(Air-to-burn-Gas Ratio)}}$$

where:
"Measured Air Rate"=the volumetric flow rate of air introduced into the combustion zone of the reactor measured at standard conditions of temperature and pressure "Measured Gas Rate"=the volumetric flow rate of gas introduced into the combustion zone of the reactor measured at standard conditions of temperature and pressure and the "Measured Air Rate", the "Measured Gas Rate" and the "Air-to-burn-Gas Ratio" are in a set of mutually consistent units. As used herein, "standard conditions of temperature and pressure" refer to a temperature of 273 Kelvin (K) and a pressure of 101.3 kilo Pascals (kPa) when describing air or gas, and, "standard conditions of temperature and pressure" refer to a temperature of 288.6 K and a pressure of 101.3 kPa when describing oil or feedstock.

The hot combustion gas stream flows downstream from zones 10 and 11 into zones 12, 17A, 17B and then 18. The direction of the flow of hot combustion gases is shown in FIG. 1 by the arrow. Carbon black-yielding feedstock 30 is introduced at point 32 located in zone 12. The feedstock may be introduced either through a probe 15, having end, 34 or preferably radially inward through a plurality of openings positioned in the wall of zone 12 at point 32, or a combination of the two. Suitable for use herein as carbon black-yielding hydrocarbon feedstocks, which are readily volatilizable under the conditions of the reaction, are unsaturated hydrocarbons such as acetylene; olefins such as ethylene, propylene, butylene; aromatics such as benzene, toluene and xylene; certain saturated hydrocarbons; and volatilized hydrocarbons such as kerosenes, naphthalenes, terpenes, ethylene tars, aromatic cycle stocks and the like.

The distance from point 32 downstream to the beginning of the zone, 17A, of restricted diameter in the reaction zone is shown as FIG. 1. In certain of the examples described herein, carbon black-yielding feedstock 30, was injected radially inward through a plurality of openings positioned in the wall of zone 12 at point 32, the resulting jets penetrating into the interior regions of the hot combustion gas stream so as to rapidly decompose and convert the feedstock to the novel carbon blacks of the present invention.

In other of the examples described herein, carbon black-yielding feedstock, 30, was injected outward in a substantially axial downstream direction through a plurality of openings at the end, 34, of probe 15, the resulting jets penetrating into the exterior regions of the hot combustion gas stream so as to rapidly decompose and convert the feedstock to the carbon blacks. The distance from the end of the probe 15 to the beginning of zone 17A is shown as F-2.

In order to produce the carbon blacks of the present invention, the overall combustion level of the carbon black production process is preferably at least 22%, more preferably 22 to 35%, and even more preferably 25 to 28%.

As referred to herein, and known to those skilled in the art, the overall combustion level represents the total amount of oxidant such as air used in the carbon forming process relative to the amount of oxidant required for the complete combustion of the total amount of hydrocarbon used in the carbon forming process to form carbon dioxide and water. The overall combustion level is usually expressed as a percentage.

For purposes of convenience, the amount of oxidant required for the complete combustion of the carbon black-yielding feedstock to carbon dioxide and water is referred to as the Air-to-burn-Oil Ratio, and expressed as a ratio of volumes of theoretical oxidant and carbon black-yielding feedstock. The quantities of oxidant and carbon black yielding feedstock may be described in any convenient and consistent set of units.

The overall combustion level may be determined according to the following formula:

Overall Combustion Level, % =

$$\frac{(\text{Measured Air Rate}) \times 100}{(\text{Measured Gas Rate}) \times (\text{Air-to-burn-Gas Ratio}) + (\text{Measured Oil Rate}) \times (\text{Air-to-burn-Oil Ratio})}$$

where:
"Measured Air Rate"=the volumetric flow rate of air introduced into the combustion zone of the reactor measured at standard conditions of temperature and pressure "Measured Gas Rate"=the volumetric flow rate of gas introduced into the combustion zone of the reactor measured at standard conditions of temperature and pressure.

"Measured Oil Rate"=the volumetric flow rate of oil introduced into the reactor measured at standard conditions of temperature and pressure.

and the "Measured Air Rate", the "Measured Gas Rate", the "Measured Oil Rate", the "Air-to-burn-Gas Ratio" and the "Air-to-burn-Oil Ratio" are in a set of mutually consistent units.

The mixture of carbon black-yielding feedstock and hot combustion gases flows downstream through zones 12, 17A, 17B and into zone 18. Quench 40, located at point 42, injecting quenching fluid 50, which in the examples described herein was water, is utilized to stop pyrolysis of the carbon black-yielding feedstock when the novel carbon blacks of the present invention are formed. Point 42 may be determined in any manner known to the art for selecting the position of a quench to stop pyrolysis.

One method for determining the position of the quench utilized to stop pyrolysis is by determining the point at which an acceptable toluene extract level for the novel carbon blacks of the present invention is achieved. Toluene extract level may be measured by using ASTM Test Procedure D1618-83, "Carbon black extractables Toluene Discoloration."

In a preferred embodiment of the process for producing the carbon blacks of the present invention, the location of the quench is determined in such manner as to ensure that the resultant nominal residence time for the carbon black forming reactions in the reactor is 0.55 second to 9.9 seconds and preferably 1.06 to 8.01 seconds. The nominal residence time in the reactor is defined herein as the time nominally required for the oxidant traveling through the reactor to travel from the point of injection of carbon black-yielding feedstock to the point of quench, if the oxidant were unaltered by any of the processes occurring in any of the stages of the staged reactor, and where the volumetric flow rate of the oxidant is defined at standard conditions of temperature and pressure.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter. This separation may be followed by pelletizing using, for example, a wet pelletizer.

Figure 2:
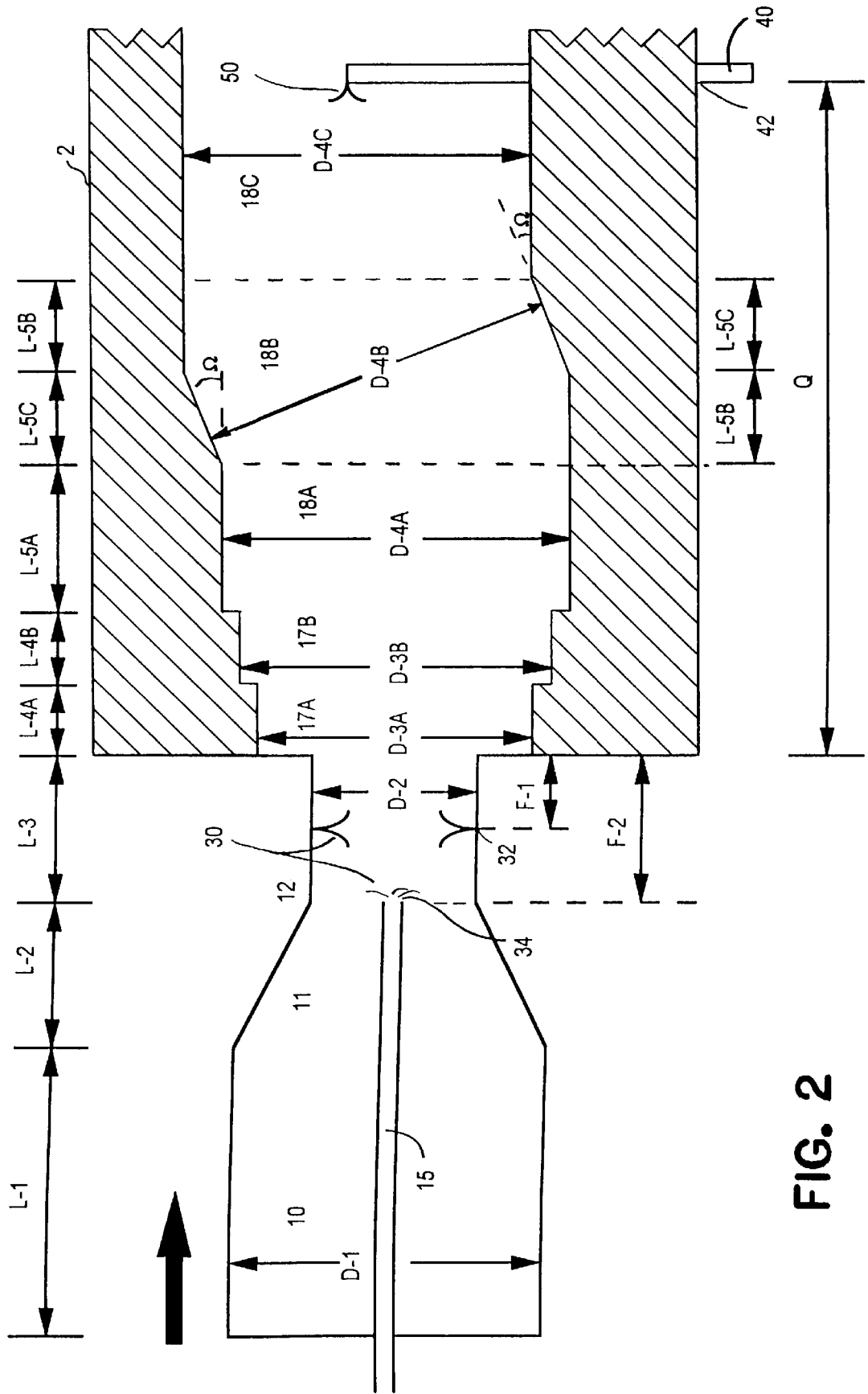
FIG. 2 is a cross-sectional view of a portion of another type of furnace carbon black reactor which may be utilized to produce the carbon blacks of the present invention.

FIG. 2 illustrates a section of another configuration of a carbon black reactor which may be utilized to produce carbon blacks of the present invention and was utilized to produce certain of the carbon blacks described in the Examples set forth herein. The reactor, 2, illustrated in FIG. 2 is substantially identical to the reactor illustrated in FIG. 1 and the reference numerals utilized in FIG. 2 are used in the same manner as in FIG. 1, with the following exceptions.

In the reactor illustrated in FIG. 2, the reaction zone further comprises zones 18A, 18B and 18C. Zone 18A is located adjacent to zone 17B. Zone 18B is located adjacent to zone 18A and is angled at an angle $\Omega$ as shown in FIG. 2. Zone 18C is located adjacent to zone 18B. The diameter of zone 18A is shown as D-4A; the diameter of zone 18B, as D-4B, and the diameter of zone 18C, as D-4C. The length of the zone, 18A is shown as L-5A; the length of each of the sections of zone 18B, in a direction parallel to the horizontal, are either L-5B or L-5C as shown in FIG. 2.

The polymer compositions of the present invention comprise a polymer and a carbon black of the present invention.

Thus, in one aspect, the present invention provides polymer compositions comprising a polymer and a carbon black having an $I_2$No. of 65–95 mg/g, preferably 73–94 mg/g, more preferably 85–93 mg/g; and a primary particle size of less than or equal to 20 nm, preferably less than or equal to 19 nm. In more detail, these polymer compositions include the following:

1a) A polymer composition comprising a polymer and a carbon blacks having an $I_2$No. of 65–95 mg/g and a primary particle size of less than or equal to 20 nm;

2a) A polymer composition comprising a polymer and a carbon black having an $I_2$No. of 73–94 mg/g and a primary particle size of less than or equal to 20 nm;

3a) A polymer composition comprising a polymer and a carbon black having an $I_2$No. of 85–93 mg/g and a primary particle size of less than or equal to 20 nm;

4a) A polymer composition comprising a polymer and a carbon black having an $I_2$No. of 65–95 mg/g and a primary particle size of less than or equal to 19 nm;

5a) A polymer composition comprising a polymer and a carbon black having an $I_2$No. of 73–94 mg/g and a primary particle size of less than or equal to 19 nm; and 6a) A polymer composition comprising a polymer and a carbon black having an $I_2$No. of 85–93 mg/g and a primary particle size of less than or equal to 19 nm.

In another aspect, the present invention provides a polymer composition comprising a polymer and a carbon black having an $I_2$No. of 100–112 mg/g; and a primary particle size of less than or equal to 20 nm, preferably less than or equal to 19 nm. In more detail, these polymer compositions include the following:

1b) A polymer composition comprising a polymer and a carbon black having an $I_2$No. of 100–112 mg/g and a primary particle size of less than or equal to 20 nm.

2b) A polymer composition comprising a polymer and a carbon black having an $I_2$No. of 100–112 mg/g and a primary particle size of less than or equal to 19 nm.

In a further aspect, the present invention provides a polymer composition comprising a polymer and a carbon black having an $I_2$No. of 65–112 mg/g, preferably 73–104 mg/g, more preferably 75–99 mg/g; a primary particle size of less than or equal to 20 nm, preferably less than or equal to 19 nm; and a CDBP of less than or equal to 102 cc/100 g, preferably 70–100 cc/100 g, more preferably 80–95 cc/100 g. In more detail, these polymer compositions include the following:

1c) A polymer composition comprising a polymer and a carbon black having an $I_2$No. of 65–112 mg/g; a primary particle size of less than or equal to 20 nm; and a CDBP of less than or equal to 102 cc/100 g.

2c) A polymer composition comprising a polymer and a carbon black having an $I_2$No. of 65–112 mg/g; a primary particle size of less than or equal to 20 nm; and a CDBP of 70–100 cc/100 g.

3c) A polymer composition comprising a polymer and a carbon black having $I_2$No. of 65–112 mg/g; a primary particle size of less than or equal to 20 nm; and a CDBP of 80–95 cc/100 g.

4c) A polymer composition comprising a polymer and a carbon black having an $I_2$No. of 65–112 mg/g; a primary particle size of less than or equal to 19 nm; and a CDBP of less than or equal to 102 cc/100 g.

5c) A polymer composition comprising a polymer and a carbon black having an $I_2$No. of 65–112 mg/g; a primary particle size of less than or equal to 19 nm; and a CDBP of 70–100 cc/100 g.

6c) A polymer composition comprising a polymer and a carbon black having $I_2$No. of 65–112 mg/g; a primary particle size of less than or equal to 19 nm; and a CDBP of 80–95 cc/100 g.

7c) A polymer composition comprising a polymer and a carbon black having an $I_2$No. of 73–104 mg/g; a primary particle size of less than or equal to 20 nm; and a CDBP of less than or equal to 102 cc/100 g.

8c) A polymer composition comprising a polymer and a carbon black having an $I_2$No. of 73–104 mg/g; a primary particle size of less than or equal to 20 nm; and a CDBP of 70–100 cc/100 g.

9c) A polymer composition comprising a polymer and a carbon black having $I_2$No. of 73–104 mg/g; a primary particle size of less than or equal to 20 nm; and a CDBP of 80–95 cc/100 g.

10c) A polymer composition comprising a polymer and a carbon black having an $I_2$No. of 73–104 mg/g; a primary particle size of less than or equal to 19 nm; and a CDBP of less than or equal to 102 cc/100 g.

11c) A polymer composition comprising a polymer and a carbon black having an $I_2$No. of 73–104 mg/g; a primary particle size of less than or equal to 19 nm; and a CDBP of 70–100 cc/100 g.

12c) A polymer composition comprising a polymer and a carbon black having $I_2$No. of 73–104 mg/g; a primary particle size of less than or equal to 19 nm; and a CDBP of 80–95 cc/100 g.

13c) A polymer composition comprising a polymer and a carbon black having an $I_2$No. of 75–99 mg/g; a primary particle size of less than or equal to 20 nm; and a CDBP of less than or equal to 102 cc/100 g.

14c) A polymer composition comprising a polymer and a carbon black having an $I_2$No. of 75–99 mg/g; a primary particle size of less than or equal to 20 nm; and a CDBP of 70–100 cc/100 g.

15c) A polymer composition comprising a polymer and a carbon black having $I_2$No. of 75–99 mg/g; a primary particle size of less than or equal to 20 nm; and a CDBP of 80–95 cc/100 g.

16c) A polymer composition comprising a polymer and a carbon black having an $I_2$No. of 75–99 mg/g; a primary particle size of less than or equal to 19 nm; and a CDBP of less than or equal to 102 cc/100 g.

17c) A polymer composition comprising a polymer and a carbon black having an $I_2$No. of 75–99 mg/g; a primary particle size of less than or equal to 19 nm; and a CDBP of 70–100 cc/100 g.

18c) A polymer composition comprising a polymer and a carbon black having $I_2$No. of 75–99 mg/g; a primary particle size of less than or equal to 19 nm; and a CDBP of 80–95 cc/100 g.

In still another aspect, the present invention provides new polymer compositions comprising a polymer and a carbon black having an $I_2$No. of 50–70 mg/g and a primary particle size of less than or equal to 25 nm. Preferably, the carbon black has an $I_2$ No. of 55–65 mg/g and/or a primary particle size of from greater than 20 nm to 25 nm. In more detail, these polymer compositions include the following:

1d) A polymer composition comprising a polymer and a carbon black having an $I_2$No. of 50–70 mg/g and a primary particle size of less than or equal to 25 nm.

2d) A polymer composition comprising a polymer and a carbon black having an $I_2$No. of 50–70 mg/g and a primary particle size of from greater than 20 nm to 25 nm.

3d) A polymer composition comprising a polymer and a carbon black having an $I_2$No. of 55–65 mg/g and a primary particle size of less than or equal to 25 nm.

4d) A polymer composition comprising a polymer and a carbon black having an $I_2$No. of 55–65 mg/g and a primary particle size of from greater than 20 nm to 25 nm.

In a further aspect, the present invention provides new polymer compositions comprising a polymer and a carbon black having an $I_2$No. of 50–85 mg/g; a primary particle size of less than or equal to 25 nm; and a CDBP of less than or equal to 96 cc/100 g. Preferably, the carbon black has an $I_2$ No. of 55–80 mg/g; a primary particle size of from greater than 20 nm to 25 nm; and/or a CDBP of 50–96 cc/100g. More preferably, the carbon black has an $I_2$ No. of 60–78 mg/g; a primary particle size of from greater than 20 nm to 25 nm; and/or a CDBP of 50–96 cc/100 g. In more detail, these polymer compositions include the following:

1e) A polymer composition comprising a polymer and a carbon black having an $I_2$No. of 50–85 mg/g; a primary particle size of less than or equal to 25 nm; and a CDBP of less than or equal to 96 cc/100 g.

2e) A polymer composition comprising a polymer and a carbon black having an $I_2$No. of 55–80 mg/g; a primary particle size of less than or equal to 25 nm; and a CDBP of less than or equal to 96 cc/100 g.

3e) A polymer composition comprising a polymer and a carbon black having an $I_2$No. of 60–78 mg/g; a primary particle size of less than or equal to 25 nm; and a CDBP of less than or equal to 96 cc/100 g.

4e) A polymer composition comprising a polymer and a carbon black having an $I_2$No. of 50–85 mg/g; a primary particle size of less than or equal to 25 nm; and a CDBP of 50–96 cc/100 g.

5e) A polymer composition comprising a polymer and a carbon black having an $I_2$No. of 55–80 mg/g; a primary particle size of less than or equal to 25 nm; and a CDBP of 50–96 cc/100 g.

6e) A polymer composition comprising a polymer and a carbon black having an $I_2$No. of 60–78 mg/g; a primary particle size of less than or equal to 25 nm; and a CDBP of 50–96 cc/100 g.

7e) A polymer composition comprising a polymer and a carbon black having an $I_2$No. of 50–85 mg/g; a primary particle size of from greater than 20 nm to 25 nm; and a CDBP of less than or equal to 96 cc/100 g.

8e) A polymer composition comprising a polymer and a carbon black having an $I_2$No. of 55–80 mg/g; a primary particle size of from greater than 20 nm to 25 nm; and a CDBP of less than or equal to 96 cc/100 g.

9e) A polymer composition comprising a polymer and a carbon black having an $I_2$No. of 60–78 mg/g; a primary particle size of from greater than 20 nm to 25 nm; and a CDBP of less than or equal to 96 cc/100 g.

10e) A polymer composition comprising a polymer and a carbon black having an $I_2$No. of 50–85 mg/g; a primary particle size of from greater than 20 nm to 25 nm; and a CDBP of 50–96 cc/100 g.

11e) A polymer composition comprising a polymer and a carbon black having an $I_2$No. of 55–80 mg/g; a primary particle size of from greater than 20 nm to 25 nm; and a CDBP of 50–96 cc/100 g.

12e) A polymer composition comprising a polymer and a carbon black having an $I_2$No. of 60–78 mg/g; a primary particle size of from greater than 20 nm to 25 nm; and a CDBP of 50–96 cc/100 g.

Although any amount of carbon black effective to achieve an intended end use may be utilized in the polymer compositions of the present invention, generally, amounts of the carbon black ranging from about 0.5 to about 300 parts by weight can be used for each 100 parts by weight of polymer. It is, however, preferred to use amounts varying from about 0.5 to about 100 parts by weight of carbon black per 100 parts by weight of polymer and especially preferred is the utilization of from about 0.5 to about 80 parts by weight of carbon black per 100 parts by weight of polymer.

The polymer compositions may include other conventional additives such as curing agents, processing additives, hydrocarbon oils, accelerators, coagents, antioxidants and the like.

As used herein "polymer" includes natural rubbers, synthetic rubbers, elastomers, plastomers, and/or blends or mixtures thereof. Examples of polymers suitable for use in the polymer compositions of the present invention are included in the listing set forth above.

The polymer compositions of the present invention may be produced by any manner known in the art for combining polymers and particulate components.

The following testing procedures were used in the determination and evaluation of the analytical properties of the carbon blacks of the present invention, and the properties of the polymer compositions incorporating the carbon blacks of the present invention.

The CTAB (cetyl trimethyl ammonium bromide adsorption area) of the carbon blacks was determined according to ASTM Test Procedure D3765-85.

The $I_2$ No. was determined according to ASTM Test Procedure D1510.

The Tint value ("Tint") of the carbon blacks was determined according to the procedure set forth in ASTM D3265.

The DBP (dibutyl phthalate absorption value) of the carbon black pellets was determined according to ASTM Test Procedure D2414.

The CDBP (crushed dibutyl phthalate absorption value) of the carbon black pellets was determined according to the procedure set forth in ASTM D3493-86.

The toluene extract level of the carbon blacks was determined utilizing a Milton Roy Spectronic 20 Spectrophotometer, manufactured by Milton Roy, Rochester, N.Y. according to ASTM Test Procedure D1618.

The particle size of the carbon blacks was determined according to the procedure set forth in ASTM D3849-89.

Figure 3:
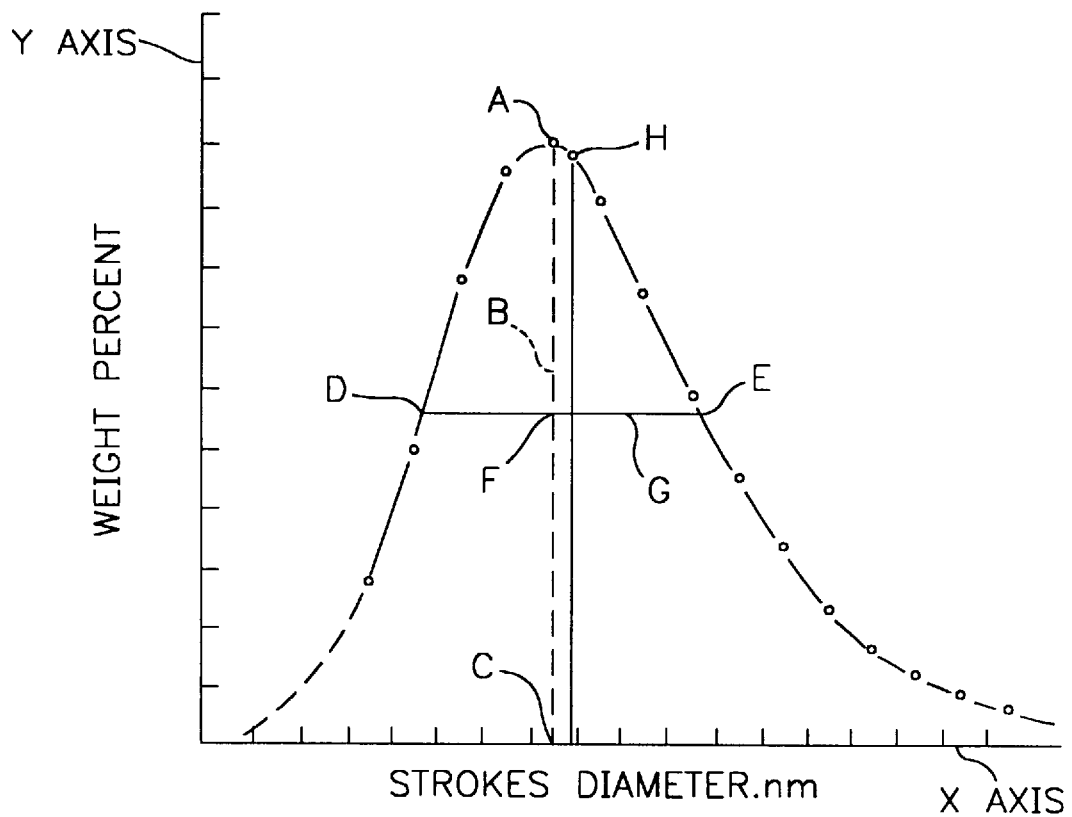
FIG. 3 is a sample histogram of the weight fraction of the aggregates of a carbon black sample versus the Stokes Diameter in a given sample.

Dmode, Dst and $\Delta$D50 values for the carbon blacks were determined from a histogram of the Stokes diameter of the carbon black aggregates of the respective carbon black samples versus the relative frequency of their occurrence in that sample, as shown in FIG. 3. A histogram is made of the Stokes diameter of the aggregates of the carbon black sample versus the relative frequency of their occurrence in a given sample.

For Examples 1 through 14 and for Examples 26 through 33, the data used to generate the histogram were determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985, the teachings of which are hereby incorporated by reference, and was used in determining the data.

The procedure is as follows. Ten mg (milligrams) of a carbon black sample are weighed in a weighing vessel, then added to 50 cc of a solution of 10% absolute ethanol and 90% distilled water which includes 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise ($9.33 \times 10^{-4}$ Pascal-seconds (Pa-s)) at 23 degrees C.;

5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. Ten cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data are analyzed according to the standard Stokes equation and are presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density, and rate of sedimentation as the object. The customary units for expressing Stokes diameter are nanometers.

Mode (Dmode for reporting purposes)—The Stokes diameter at the point of the peak (Point A of FIG. 3 herein) of the distribution curve for Stokes diameter.

Median Stokes diameter—(Dst for reporting purposes) the point on the distribution curve of Stokes diameter where 50% by weight of the sample is either larger or smaller (Point H of FIG. 3 herein). It therefore represents the median value of the determination. A non-spherical object such as a carbon black aggregate may also be represented in terms of the Stokes diameter if it is considered as behaving as a smooth, rigid sphere of the same density and rate of sedimentation as the non-spherical object.

ΔD50—The width of the plot of the mass distribution, measured at the half-maximum point of the mode, which is a measure of the breadth of the aggregate size distribution. It was determined in the following manner. As shown in FIG. 3, a line B is drawn from the peak A of the histogram in a direction parallel to the Y axis, to and ending at the X axis at point C of the histogram. The midpoint F of the resultant line B is determined and a line G is drawn through the midpoint F thereof parallel to the X axis. Line G intersects the distribution curve of the histogram at two points D and E. The absolute value of the difference of the Stokes diameters of the carbon black aggregates at points D and E is the αD50 value.

For Examples 15 through 25, a disk centrifuge manufactured by Brookhaven Instruments, Model BI-DCP (manufactured by Brookhaven Instruments Corp., 750 Blue Point Road, Holtsville, N.Y. 11742, USA), was used to generate the histograms described earlier. The following procedure was used.

Ten mg (milligrams) of a carbon black sample are weighed in a weighing vessel, then added to 25 cc of a solution of 10% absolute ethanol and 90% distilled water includes 0.025% NONIDET P-40 surfactant (NONIDET P-40 is a registered trademark for a surfactant manufactured and sold by Shell Chemical Co.). The resulting suspension is dispersed by means of ultrasonic energy for 10 minutes using Sonicator Model No. XL 2015, manufactured and sold by Heat Systems Ultrasonics Inc., Farmingdale, N.Y.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.2 cc.;
3. The volume of spin fluid, which in this instance is 10 cc of water;
4. The viscosity of the spin fluid, which in this instance is taken as 0.933 centipoise ($9.33 \times 10^{-4}$ Pascal-seconds (Pa-s)) at 23 degrees C.;
5. The density of the spin fluid, which in this instance is 0.998 g/cc at 23 degrees C.;
6. The disk speed, which in this instance is 4000 rpm;
7. The data sampling interval, which in this instance is 1 second.

The disk centrifuge is operated at 4000 rpm while the stroboscope is operating. Ten cc of a mixture of distilled water and sucrose solution, of which distilled water constitutes 9 cc and the sucrose solution 1 cc, are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.2 cc of the dispersed carbon black in aqueous ethanol solution is injected into the spinning disk and data collection is started immediately. If streaming occurs the run is aborted. The disk is spun for such a length of time as is needed for the detector response to return to the baseline following the injection of the dispersed carbon black in aqueous ethanol solution. Following the time period of spinning, the disk is stopped, the temperature of the spin fluid is measured with the built-in temperature probe, and the average of the temperature of the spin fluid measured at the beginning of the run and the temperature of the spin fluid measured at the end of the run is entered into the computer which records the data from the disk centrifuge.

The measurements of apparent viscosity and melt flow index were performed on polymer compositions prepared by incorporating the carbon black samples into linear low density polyethylene (LLDPE) at a 35% loading by mass of carbon black in the mixture with the polymer, except where a different loading of carbon black is specified hereunder. The following procedure was used to prepare the mixture of carbon black and polymer having a 35% loading by mass of carbon black in the mixture. This procedure was also followed when loadings different from 35% by mass of carbon black were needed, except that the relative proportions of carbon black and polymer were modified to the levels needed to yield the desired loading of carbon black in the mixture.

Both 420.7 grams carbon black and 781.4 grams linear low density polyethylene (LLDPE) identified as DFDA7510 for carbon blacks from Examples 1 through 14 and GRSN7510 for carbon blacks from Examples 26 through 33 were charged into a Farrel laboratory Banbury mixer having a mixing chamber with a volume of 1100 cubic centimeters. DFDA7510 polyethylene and GRSN7510 polyethylene are manufactured and sold by Union Carbide. The initial temperature of the mixing step was about 120° F., (322 K) and the mixing was performed for 3 minutes: the first 30 seconds at 77 rpm, the next 45 seconds at 116 rpm, and the remainder of the mixing time at 155 rpm. Following mixing, the product was sheeted off on a two roll mill at 180° F. (355 K) into ⅜ inch, (0.0095 m) thick sheets. The sheets were then cut into strips and run through a dicer converting them into cubes of ⅜ inch (0.0095 m) per side. The product was screened to ensure that only uniformly-sized pieces were used for subsequent testing.

The apparent viscosity was measured according to the procedure set forth in ASTM D3835-93A at a temperature of 190° C. For polymer compositions containing carbon blacks from Examples 1 through 14, these measurements utilized a Gottfert Capillary Rheometer Model 1501 with a capillary of 30 millimeter (mm) length and 1 mm diameter. For polymer compositions containing carbon blacks from Examples 26 through 33, these measurements utilized a Monsanto Processability Tester with a capillary of 20 millimeter (mm) length and 1 mm diameter.

In order to prepare sample specimens for measurement of the coefficient of absorption (COA), the above mixture of carbon black and LLDPE, containing 35% by mass of carbon black, was charged into the Banbury mixer with as much additional LLDPE as was required to result in a final mixture containing 2.5% by mass of carbon black. The product mixture from this step was then used for measuring the COA. The COA was measured according to the procedure set forth in ASTM D3349-86.

The melt flow index was measured in accordance with ASTM Test Procedure D1238-90, utilizing a temperature of 190° C. for polymer compositions containing carbon blacks from Examples 1 through 14 and a temperature of 230° C. for polymer compositions containing carbon blacks from Examples 26 through 33, and a 21.5 kg weight and adapted to include the following:

| Flow range, g/10 min | Suggested weight of sample in cylinder, g | Time interval flow, min | Factor for obtaining rate in g/10 min |
| --- | --- | --- | --- |
| >1.0 to 3.5 | 3.0–5.0 | 3.00 | 3.33 |
| >3.5 to 10 | 5.0–8.0 | 1.00 | 10.00 | g = gram(s)
min = minute(s)

The appropriate mass of carbon black-containing polymer composition was weighed out, charged into the cylinder of the Keyness Model 2051 or equivalent extrusion plastometer, and compacted. The piston was inserted into the cylinder and with a 1100 gram weight on the piston, the charge preheated for 6 minutes at the test temperature. After the preheat time period was complete, the preheat weight was removed from the piston and replaced with the test weight, 21.5 kg for the results described in Table 4. Simultaneous with disappearance of the notch on the piston into the cylinder, extrudate at the bottom of the die orifice was cut with a sharp spatula or knife and the test time interval begun. When the test time interval ended, extrudate at the bottom of the die orifice was cut and weighed. This weight was recorded and converted into the measured Melt Flow Index result by multiplying with the appropriate factor in the previous table.

Compound moisture absorption (CMA) was measured on a mixture of carbon black and polymer prepared in a Brabender plasticorder at 100° C. using 35.75 grams of the LLDPE polymer referred to previously and 19.25 grams carbon black. The rotors were turned on to 60 rpm after the desired temperature was reached, and the weighed quantities of polymer and carbon black charged through the loading chute over a 30 second period. A 10,000 kilogram weight was added to the chute ram, putting the ingredients down to flux. The weights and chute were removed after flux. The rotor speed was adjusted to 60 rpm, the Brabender ram lowered and the compound mixed for five minutes. After this time period was complete, the compound was removed and passed twice through a two-roll mill. The resulting sheets were diced into smaller pieces for CMA testing.

CMA testing was performed on the above mixture containing carbon black and polymer according to the following procedure. The compound to be tested, after being diced as mentioned in the previous paragraph, was sieved through 4 mesh and 10 mesh screens, and the −4, +10 fraction was saved for use. A Wiley Mill with a 4 mm screen-Model #3 or equivalent, was turned on and approximately 25 grams of screened compound dropped into it. The granulated compound was removed and stored in a sealed labelled jar. A clean dry weighing bottle and its cover were weighed on an Ainsworth Model 10 or equivalent analytical balance, and this weight recorded to the fourth decimal place. 2.0 grams ±0.1 gram of granulated compound were placed in this weighing bottle. The weighing bottle, with its cover ajar, was placed in a vacuum oven, the oven door was sealed and the oven and vacuum turned on. The temperature was set at 140° F. (333 K) and the vacuum set at 10 inches mercury (Hg) (33.9 kPa). The sample was left in the oven for at least 2 hours and at most 16 hours.

A Blue M Model FR-251B-1 or equivalent humidity cabinet was set at 80° F. (300 K) and 83% relative humidity. When drying of the sample was complete, the vacuum oven was turned off, the vacuum released, the door opened quickly, and the cover placed on the sample bottle without touching the cover directly with hands; either gloves or forceps were used for this purpose. The sample bottle was placed into a plastic container containing a desiccant. The container was sealed and the bottle allowed to cool for about thirty minutes at ambient temperature. Then the bottle was weighed on the analytical balance. Handling the bottle with gloves or forceps only, the weight was recorded to the fourth decimal place. The bottle was then placed in the humidity cabinet. When more than one bottle was tested at the same time, at least two inches space were left between the chamber walls and each sample bottle, and each sample bottle was at least a half inch away from every other sample bottle. The bottle was uncovered and the cover left ajar on the bottle. The inner door of the chamber was closed and sealed. Then the outer door was closed. The bottle was left in the humidity chamber for seven days at the temperature and relative humidity stated previously.

Following the stated time period for residence in the humidity chamber, the chamber doors were opened and the bottle sealed with its cover. The bottle was again placed in the plastic container containing desiccant; only gloves or forceps were used to handle the bottle. Each covered bottle was weighed on the analytical balance. The CMA was computed from the gain in weight of the sample.

The features and advantages of the carbon blacks and the polymer compositions of the present invention are further illustrated by the following Examples.

Examples 1–33

Thirty three carbon blacks were prepared in a reactor generally described herein, and as depicted in either FIG. 1 or FIG. 2 (as specified hereunder) utilizing the conditions and geometry set forth in Table 2. The carbon blacks produced in examples 3–10 are furnace carbon blacks of the present invention with the carbon blacks produced in examples 1 and 2 being the corresponding controls. The carbon blacks produced in examples 12–14 are also furnace carbon blacks of the present invention with the carbon black produced in example 11 being the corresponding control. The carbon blacks produced in examples 15–25 are control carbon blacks. The carbon blacks produced in examples 26–29 are furnace carbon blacks of the present invention with the carbon blacks produced in examples 30–33 being the corresponding controls.

The fuel utilized in the combustion reaction was natural gas. Typical properties of the type of liquid feedstock utilized in Examples 1–14 are set forth in Table 1. Properties of the liquid feedstock utilized in Examples 15–33 are set forth in Table 1A.

TABLE 1

| Examples 1–14 | |
|---|---|
| Hydrogen (wt. %) | 7.2 |
| Carbon (wt. %) | 91.6 |
| H/C ratio | 0.94 |
| API gravity 15.6/15.6° C. (60° F.) | −2.7 |
| BMCI (Visc-Grav) | 143 |
| Air-to-burn-Oil Ratio (SCM air/m$^3$ oil) | 10900.4 |
| Specific gravity 15.6/15.6° C. (60° F.) | 1.10 |

SCM = standard cubic meter
m = meter

TABLE 1A

| | Examples 15–33 | | |
|---|---|---|---|
| | Measured Properties for Examples | | |
| | 15–25 | 26, 30 | 27–29, 31–33 |
| Hydrogen (wt. %) | 7.2 | 7.0 | 7.1 |
| Carbon (wt. %) | 91.5 | 91.1 | 91.4 |
| H/C ratio | 0.94 | 0.91 | 0.93 |
| API gravity 15.6/15.6° C. (60° F.) | NM | −3.1 | −2.9 |
| BMCI (Visc-Grav) | NM | 137 | 136 |
| Air-to-burn-Oil Ratio (SCM air/m$^3$ oil) | 11126.9 | 10999.5 | 11070.3 |
| Specific gravity 15.6/15.6° C. (60° F.) | 1.105 | 1.102 | 1.10 |

SCM = standard cubic meter
m = meter
NM = Not Measured

The reactor conditions and geometry utilized in each example were as set forth in Table 2 below. In Examples 16 through 18, each orifice used to inject feed stock was equipped with spinner inserts. In Examples 19 and 20, the feedstock was injected into the process in a substantially axial downstream direction through a 0.09 inch (0.00229 meter (m)) diameter pressure atomizing oil tip discharging from the end, 34, of probe 15, which was retracted approximately 0.8 inches (0.02 m) from the axial midpoint of the second stage of the present process. The oil tip was Monarch spray tip number F-94-120-45 made by Monarch Manufacturing (Philadelphia, Pa., USA).

TABLE 2

| | Example | | | | |
|---|---|---|---|---|---|
| | 1 | 2 | 3 | 4 | 5 |
| | | | FIG. | | |
| | 1 | 1 | 1 | 1 | 1 |
| D-1, m | 0.51 | 0.51 | 0.51 | 0.51 | 0.51 |
| D-2, m | 0.31 | 0.31 | 0.31 | 0.31 | 0.31 |
| D-3A, m | 0.46 | 0.46 | 0.46 | 0.46 | 0.46 |
| D-3B, m | 0.46 | 0.46 | 0.46 | 0.46 | 0.46 |
| D-4, m | 1.14 | 1.14 | 1.14 | 1.14 | 1.14 |
| D-4A, m | NA | NA | NA | NA | NA |
| D-4B, m | NA | NA | NA | NA | NA |
| D-4C, m | NA | NA | NA | NA | NA |
| L-1, m | 0.30 | 0.30 | 0.30 | 0.30 | 0.30 |
| L-2, m | 0.74 | 0.74 | 0.74 | 0.74 | 0.74 |
| L-3, m | 0.30 | 0.30 | 0.30 | 0.30 | 0.30 |
| L-4A, m | 0.23 | 0.23 | 0.23 | 0.23 | 0.23 |
| L-4B, m | 0 | 0 | 0 | 0 | 0 |
| L-5A, m | NA | NA | NA | NA | NA |
| L-5B, m | NA | NA | NA | NA | NA |
| L-5C, m | NA | NA | NA | NA | NA |
| F-1, m | 0.15 | 0.15 | 0.15 | 0.15 | 0.15 |
| F-2, m | NA | NA | NA | NA | NA |
| Q, m | 4.57 | 4.57 | 4.57 | 4.57 | 4.57 |
| Ω deg. | NA | NA | NA | NA | NA |

TABLE 2-continued

| | | | | | |
|---|---|---|---|---|---|
| Oil injection tips, 32 (no. × size, cm) | 12 × 0.198 | 12 × 0.198 | 12 × 0.211 | 12 × 0.211 | 12 × 0.211 |
| Oil rate, m³/s | 1.27E-03 | 1.27E-03 | 1.28E-03 | 1.38E-03 | 1.36E-03 |
| Oil preheat, K. | 478 | 478 | 478 | 478 | 478 |
| Oil pressure, kPa | 1741 | 1824 | 1535 | 1762 | 1721 |
| Comb. Air, SCMS | 4.019 | 4.019 | 4.019 | 4.019 | 4.019 |
| Comb. Air Preheat, K. | 922 | 922 | 922 | 922 | 922 |
| Natural Gas, SCMS | 0.060 | 0.060 | 0.042 | 0.060 | 0.060 |
| Air-to-burn-Gas Ratio | 9.7 | 9.7 | 9.7 | 9.7 | 9.7 |
| Air/Gas, SCM/SCM | 67.5 | 67.5 | 96.4 | 67.5 | 67.5 |
| Primary Combustion Level, % | 696 | 696 | 994 | 696 | 696 |
| Overall Combustion Level, % | 27.9 | 27.9 | 27.9 | 25.7 | 26.0 |
| K+, g K+/m³ oil | 11.04 | 8.35 | 10.91 | 10.12 | 10.25 |
| Residence Time, s | 1.06 | 1.06 | 1.06 | 1.06 | 1.06 |
| Temp. at Q, K. | 978 | 1018 | 982 | 987 | 992 |
| Quench pressure, kPa | 735 | 708 | 708 | 694 | 708 |

| | Example | | | | |
|---|---|---|---|---|---|
| | 6 | 7 | 8 | 9 | 10 |
| | | | FIG. | | |
| | 1 | 1 | 1 | 1 | 1 |
| D-1, m | 0.51 | 0.51 | 0.51 | 0.51 | 0.51 |
| D-2, m | 0.31 | 0.31 | 0.31 | 0.31 | 0.31 |
| D-3A, m | 0.46 | 0.46 | 0.46 | 0.46 | 0.46 |
| D-3B, m | 0.46 | 0.46 | 0.46 | 0.46 | 0.46 |
| D-4, m | 1.14 | 1.14 | 1.14 | 1.14 | 1.14 |
| D-4A, m | NA | NA | NA | NA | NA |
| D-4B, m | NA | NA | NA | NA | NA |
| D-4C, m | NA | NA | NA | NA | NA |
| L-1, m | 0.30 | 0.30 | 0.30 | 0.30 | 0.30 |
| L-2, m | 0.74 | 0.74 | 0.74 | 0.74 | 0.74 |
| L-3, m | 0.30 | 0.30 | 0.30 | 0.30 | 0.30 |
| L-4A, m | 0.23 | 0.23 | 0.23 | 0.23 | 0.23 |
| L-4B, m | 0 | 0 | 0 | 0 | 0 |
| L-5A, m | NA | NA | NA | NA | NA |
| L-5B, m | NA | NA | NA | NA | NA |
| L-5C, m | NA | NA | NA | NA | NA |
| F-1, m | 0.15 | 0.15 | 0.15 | 0.15 | 0.15 |
| F-2, m | NA | NA | NA | NA | NA |
| Q, m | 24.38 | 24.38 | 13.72 | 13.72 | 4.57 |
| Ω deg. | NA | NA | NA | NA | NA |
| Oil injection tips, 32 (no. × size, cm) | 12 × 0.211 | 12 × 0.218 | 12 × 0.211 | 12 × 0.218 | 12 × 0.218 |
| Oil rate, m³/s | 1.36E-03 | 1.38E-03 | 1.36E-03 | 1.38E-03 | 1.38E-03 |
| Oil preheat, K. | 478 | 478 | 478 | 478 | 478 |
| Oil pressure, kPa | 1714 | 1445 | 1707 | 1452 | 1452 |
| Comb. Air, SCMS | 4.019 | 4.019 | 4.019 | 4.019 | 4.019 |
| Comb. Air Preheat, K. | 922 | 922 | 922 | 922 | 922 |
| Natural Gas, SCMS | 0.060 | 0.042 | 0.060 | 0.042 | 0.042 |
| Air-to-burn-Gas Ratio | 9.7 | 9.7 | 9.7 | 9.7 | 9.7 |
| Air/Gas, SCM/SCM | 67.5 | 96.4 | 67.5 | 96.4 | 96.4 |
| Primary Combustion Level, % | 696 | 994 | 696 | 994 | 994 |
| Overall Combustion Level, % | 26.0 | 26.0 | 26.0 | 26.0 | 26.0 |
| K+, g K+/m³ oil | 10.25 | 9.01 | 6.84 | 6.76 | 6.76 |
| Residence Time, s | 5.85 | 5.85 | 3.27 | 3.27 | 1.06 |
| Temp. at Q, K. | 1003 | 1015 | 1015 | 1020 | 1018 |
| Quench pressure, kPa | 722 | 749 | 694 | 673 | 708 |

| | Example | | | |
|---|---|---|---|---|
| | 11 | 12 | 13 | 14 |
| | | FIG. | | |
| | 1 | 1 | 1 | 1 |
| D-1, m | 0.51 | 0.51 | 0.51 | 0.51 |
| D-2, m | 0.31 | 0.31 | 0.31 | 0.31 |
| D-3A, m | 0.46 | 0.46 | 0.46 | 0.46 |
| D-3B, m | 0.46 | 0.46 | 0.46 | 0.46 |
| D-4, m | 1.14 | 1.14 | 1.14 | 1.14 |
| D-4A, m | NA | NA | NA | NA |
| D-4B, m | NA | NA | NA | NA |
| D-4C, m | NA | NA | NA | NA |
| L-1, m | 0.30 | 0.30 | 0.30 | 0.30 |
| L-2, m | 0.74 | 0.74 | 0.74 | 0.74 |
| L-3, m | 0.30 | 0.30 | 0.30 | 0.30 |

TABLE 2-continued

|  |  |  |  |  |
|---|---|---|---|---|
| L-4A, m | 0.23 | 0.23 | 0.23 | 0.23 |
| L-4B, m | 0 | 0 | 0 | 0 |
| L-5A, m | NA | NA | NA | NA |
| L-5B, m | NA | NA | NA | NA |
| L-5C, m | NA | NA | NA | NA |
| F-1, m | 0.15 | 0.15 | 0.15 | 0.15 |
| F-2, m | NA | NA | NA | NA |
| Q, m | 13.72 | 27.43 | 24.38 | 18.29 |
| Ω deg. | NA | NA | NA | NA |
| Oil injection tips, 32 (no. × size, cm) | 12 × 0.198 | 12 × 0.218 | 12 × 0.218 | 12 × 0.218 |
| Oil rate, m$^3$/s | 1.28E-03 | 1.32E-03 | 1.31E-03 | 1.32E-03 |
| Oil preheat, K. | 478 | 478 | 478 | 478 |
| Oil pressure, kPa | 1686 | 1293 | 1287 | 1293 |
| Comb. Air, SCMS | 4.019 | 4.019 | 4.019 | 4.019 |
| Comb. Air Preheat, K. | 922 | 887 | 897 | 897 |
| Natural Gas, SCMS | 0.060 | 0.042 | 0.045 | 0.042 |
| Air-to-burn-Gas Ratio | 9.7 | 9.7 | 9.7 | 9.7 |
| Air/Gas, SCM/SCM | 67.5 | 96.4 | 88.5 | 96.4 |
| Primary Combustion Level, % | 696 | 994 | 913 | 994 |
| Overall Combustion Level, % | 27.6 | 27.1 | 27.2 | 27.1 |
| K+, g K+/m$^3$ oil | 10.67 | 6.58 | 6.87 | 6.58 |
| Residence Time, s | 3.27 | 6.58 | 5.85 | 4.37 |
| Temp. at Q, K. | 1089 | 1089 | 1078 | 1086 |
| Quench pressure, kPa | 749 | 701 | 735 | 728 |

|  | Example | | | | |
|---|---|---|---|---|---|
|  | 15 | 16 | 17 | 18 | 19 |
|  |  |  | FIG. |  |  |
|  | 2 | 1 | 1 | 1 | 1 |
| D-1, m | 0.18 | 0.18 | 0.18 | 0.18 | 0.18 |
| D-2, m | 0.13 | 0.13 | 0.13 | 0.13 | 0.13 |
| D-3A, m | 0.25 | 0.25 | 0.25 | 0.25 | 0.25 |
| D-3B, m | 0.69 | 0.69 | 0.69 | 0.69 | 0.69 |
| D-4, m | NA | 0.69 | 0.69 | 0.69 | 0.69 |
| D-4A, m | 0.91 | NA | NA | NA | NA |
| D-4B, m | 0.86 | NA | NA | NA | NA |
| D-4C, m | 0.91 | NA | NA | NA | NA |
| L-1, m | 0.61 | 0.61 | 0.61 | 0.61 | 0.61 |
| L-2, m | 0.30 | 0.30 | 0.30 | 0.30 | 0.30 |
| L-3, m | 0.22 | 0.22 | 0.22 | 0.22 | 0.22 |
| L-4A, m | 0.25 | 0.25 | 0.25 | 0.25 | 0.25 |
| L-4B, m | 0.09 | 0 | 0 | 0 | 0 |
| L-5A, m | 4.80 | NA | NA | NA | NA |
| L-5B, m | 0.15 | NA | NA | NA | NA |
| L-5C, m | 0.46 | NA | NA | NA | NA |
| F-1, m | 0.11 | 0.11 | 0.11 | 0.11 | 0.11 |
| F-2, m | NA | NA | NA | NA | 0.13 |
| Q, m | 7.71 | 8.02 | 8.02 | 8.02 | 8.02 |
| Ω deg. | 31.5 | NA | NA | NA | NA |
| Oil injection tips, 32 (no. × size, cm) | 4 × 0.206 | 4 × 0.079 | 4 × 0.079 | 4 × 0.079 | 1 × 0.229 (Tip 34) |
| Oil rate, m$^3$/s | 1.36E-04 | 1.29E-04 | 1.38E-04 | 1.48E-04 | 1.34E-04 |
| Oil preheat, K. | 400 | 402 | 398 | 399 | 403 |
| Oil pressure, kPa | 253 | 3402 | 3836 | 4394 | 1604 |
| Comb. Air, SCMS | 0.447 | 0.447 | 0.447 | 0.447 | 0.447 |
| Comb. Air Preheat, K. | 755 | 755 | 755 | 755 | 755 |
| Natural Gas, SCMS | 0.014 | 0.011 | 0.011 | 0.012 | 0.011 |
| Air-to-burn-Gas Ratio | 9.68 | 9.68 | 9.68 | 9.68 | 9.68 |
| Air/Gas, SCM/SCM | 31.9 | 39.2 | 39.2 | 38.5 | 39.0 |
| Primary Combustion Level, % | 330 | 405 | 405 | 397 | 402 |
| Overall Combustion Level, % | 27.2 | 28.7 | 27.2 | 25.4 | 27.9 |
| K+, g K+/m$^3$ oil | 0 | 0 | 0 | 0 | 0 |
| Residence Time, s | 10.39 | 6.31 | 6.31 | 6.31 | 6.31 |
| Temp. at Q, K. | 1005 | 1005 | 1005 | 1005 | 1005 |
| Quench pressure, kPa | 542 | 701 | 715 | 722 | 784 |

|  | Example | | | | |
|---|---|---|---|---|---|
|  | 20 | 21 | 22 | 23 | 24 |
|  |  |  | FIG. |  |  |
|  | 1 | 1 | 1 | 1 | 1 |
| D-1, m | 0.18 | 0.18 | 0.18 | 0.18 | 0.18 |
| D-2, m | 0.13 | 0.13 | 0.13 | 0.13 | 0.13 |

TABLE 2-continued

| | | | | | |
|---|---|---|---|---|---|
| D-3A, m | 0.25 | 0.25 | 0.25 | 0.25 | 0.27 |
| D-3B, m | 0.69 | 0.69 | 0.69 | 0.69 | 0.27 |
| D-4, m | 0.69 | 0.69 | 0.69 | 0.69 | 0.34 |
| D-4A, m | NA | NA | NA | NA | NA |
| D-4B, m | NA | NA | NA | NA | NA |
| D-4C, m | NA | NA | NA | NA | NA |
| L-1, m | 0.61 | 0.61 | 0.61 | 0.61 | 0.61 |
| L-2, m | 0.30 | 0.30 | 0.30 | 0.30 | 0.30 |
| L-3, m | 0.22 | 0.22 | 0.22 | 0.22 | 0.22 |
| L-4A, m | 0.25 | 0.25 | 0.25 | 0.25 | 1.60 |
| L-4B, m | 0 | 0 | 0 | 0 | 0 |
| L-5A, m | NA | NA | NA | NA | NA |
| L-5B, m | NA | NA | NA | NA | NA |
| L-5C, m | NA | NA | NA | NA | NA |
| F-1, m | 0.11 | 0.11 | 0.11 | 0.11 | 0.11 |
| F-2, m | 0.13 | NA | NA | NA | NA |
| Q, m | 8.02 | 8.02 | 8.02 | 8.02 | 1.77 |
| Ω deg. | NA | NA | NA | NA | NA |
| Oil injection tips, 32 (no. × size, cm) | 1 × 0.229 (Tip 34) | 4 × 0.206 | 4 × 0.206 | 4 × 0.206 | 4 × 0.140 |
| Oil rate, m$^3$/s | 1.40E-04 | 1.90E-04 | 1.77E-04 | 1.86E-04 | 2.08E-04 |
| Oil preheat, K. | 401 | 400 | 404 | 404 | 402 |
| Oil pressure, kPa | 1769 | 349 | 329 | 342 | 1583 |
| Comb. Air, SCMS | 0.447 | 0.633 | 0.633 | 0.633 | 0.744 |
| Comb. Air Preheat, K. | 755 | 755 | 755 | 755 | 894 |
| Natural Gas, SCMS | 0.012 | 0.016 | 0.016 | 0.01 | 0.022 |
| Air-to-burn-Gas Ratio | 9.68 | 9.68 | 9.68 | 9.68 | 9.68 |
| Air/Gas, SCM/SCM | 38.2 | 38.5 | 38.5 | 68.0 | 34.7 |
| Primary Combustion Level, % | 395 | 397 | 397 | 702 | 359 |
| Overall Combustion Level, % | 26.7 | 27.8 | 29.8 | 29.3 | 29.4 |
| K+, g K+/m$^3$ oil | 0 | 0 | 0 | 0 | 2.96 |
| Residence Time, s | 6.31 | 4.45 | 4.45 | 4.45 | 0.14 |
| Temp. at Q, K. | 1005 | 1005 | 1005 | 1005 | 1005 |
| Quench pressure, kPa | 749 | 391 | 405 | 411 | 804 |

| | Example | | | | |
|---|---|---|---|---|---|
| | 25 | 26 | 27 | 28 | 29 |
| | FIG. | | | | |
| | 1 | 1 | 1 | 1 | 2 |
| D-1, m | 0.18 | 0.18 | 0.18 | 0.18 | 0.18 |
| D-2, m | 0.13 | 0.16 | 0.16 | 0.16 | 0.16 |
| D-3A, m | 0.27 | 0.19 | 0.19 | 0.19 | 0.19 |
| D-3B, m | 0.27 | 0.19 | 0.19 | 0.19 | 0.69 |
| D-4, m | 0.34 | 0.69 | 0.69 | 0.69 | NA |
| D-4A, m | NA | NA | NA | NA | 0.91 |
| D-4B, m | NA | NA | NA | NA | 0.86 |
| D-4C, m | NA | NA | NA | NA | 0.91 |
| L-1, m | 0.61 | 0.61 | 0.61 | 0.61 | 0.61 |
| L-2, m | 0.30 | 0.30 | 0.30 | 0.30 | 0.30 |
| L-3, m | 0.22 | 0.22 | 0.22 | 0.22 | 0.22 |
| L-4A, m | 1.60 | 0.13 | 0.13 | 0.13 | 0.13 |
| L-4B, m | 0 | 0 | 0 | 0 | 3.54 |
| L-5A, m | NA | NA | NA | NA | 1.60 |
| L-5B, m | NA | NA | NA | NA | 0.15 |
| L-5C, m | NA | NA | NA | NA | 0.46 |
| F-1, m | 0.11 | 0.11 | 0.11 | 0.11 | 0.11 |
| F-2, m | NA | NA | NA | NA | NA |
| Q, m | 3.05 | 3.29 | 3.29 | 3.29 | 9.30 |
| Ω deg. | NA | NA | NA | NA | 31.5 |
| Oil injection tips, 32 (no. × size, cm) | 4 × 0.118 | 9 × 0.140 | 9 × 0.140 | 9 × 0.140 | 9 × 0.140 |
| Oil rate, m$^3$/s | 2.00E-04 | 1.98E-04 | 1.98E-04 | 1.98E-04 | 1.98E-04 |
| Oil preheat, K. | 387 | 409 | 417 | 434 | 436 |
| Oil pressure, kPa | 2334 | 384 | 384 | 377 | 384 |
| Comb. Air, SCMS | 0.744 | 0.595 | 0.595 | 0.595 | 0.595 |
| Comb. Air Preheat, K. | 755 | 755 | 755 | 755 | 755 |
| Natural Gas, SCMS | 0.041 | 0.009 | 0.009 | 0.009 | 0.009 |
| Air-to-burn-Gas Ratio | 9.68 | 9.64 | 9.31 | 9.61 | 9.64 |
| Air/Gas, SCM/SCM | 18.1 | 67.8 | 67.2 | 67.2 | 67.8 |
| Primary Combustion Level, % | 187 | 703 | 722 | 700 | 703 |
| Overall Combustion Level, % | 28.4 | 26.4 | 26.2 | 26.2 | 26.2 |
| K+, g K+/m$^3$ oil | 0 | 1.35 | 186.24 | 187.13 | 187.13 |
| Residence Time, s | 0.29 | 1.86 | 1.86 | 1.86 | 8.01 |
| Temp. at Q, K. | 1005 | 1006 | 1004 | 1005 | 1005 |
| Quench pressure, kPa | 708 | 425 | 446 | 460 | 329 |

TABLE 2-continued

|  | Example | | | |
|---|---|---|---|---|
|  | 30 | 31 | 32 | 33 |
|  | FIG. | | | |
|  | 2 | 1 | 2 | 1 |
| D-1, m | 0.18 | 0.18 | 0.18 | 0.18 |
| D-2, m | 0.16 | 0.16 | 0.16 | 0.16 |
| D-3A, m | 0.19 | 0.19 | 0.19 | 0.19 |
| D-3B, m | 0.69 | 0.19 | 0.69 | 0.19 |
| D-4, m | NA | 0.69 | NA | 0.69 |
| D-4A, m | 0.91 | NA | 0.91 | NA |
| D-4B, m | 0.86 | NA | 0.86 | NA |
| D-4C, m | 0.91 | NA | 0.91 | NA |
| L-1, m | 0.61 | 0.61 | 0.61 | 0.61 |
| L-2, m | 0.30 | 0.30 | 0.30 | 0.30 |
| L-3, m | 0.22 | 0.22 | 0.22 | 0.22 |
| L-4A, m | 0.13 | 0.13 | 0.13 | 0.13 |
| L-4B, m | 3.54 | 0 | 3.54 | 0 |
| L-5A, m | 1.60 | NA | 1.60 | NA |
| L-5B, m | 0.15 | NA | 0.15 | NA |
| L-5C, m | 0.46 | NA | 0.46 | NA |
| F-1, m | 0.11 | 0.11 | 0.11 | 0.11 |
| F-2, m | NA | NA | NA | NA |
| Q, m | 9.30 | 3.29 | 9.30 | 3.29 |
| Ω deg. | 31.5 | NA | 31.5 | NA |
| Oil injection tips, 32 (no. × size, cm) | 9 × 0.097 | 9 × 0.097 | 9 × 0.097 | 9 × 0.097 |
| Oil rate, m³/s | 1.69E-04 | 1.70E-04 | 1.70E-04 | 1.70E-04 |
| Oil preheat, K. | 428 | 434 | 432 | 449 |
| Oil pressure, kPa | 942 | 963 | 908 | 921 |
| Comb. Air, SCMS | 0.595 | 0.595 | 0.595 | 0.595 |
| Comb. Air Preheat, K. | 755 | 755 | 755 | 755 |
| Natural Gas, SCMS | 0.042 | 0.042 | 0.042 | 0.039 |
| Air-to-burn-Gas Ratio | 9.35 | 9.35 | 9.32 | 10.30 |
| Air/Gas, SCM/SCM | 14.0 | 14.1 | 14.0 | 15.1 |
| Primary Combustion Level, % | 150 | 151 | 150 | 146 |
| Overall Combustion Level, % | 26.3 | 26.2 | 26.1 | 26.0 |
| K+, g K+/m³ oil | 188.75 | 188.53 | 188.16 | 188.16 |
| Residence Time, s | 8.01 | 1.86 | 8.01 | 1.86 |
| Temp. at Q, K. | 1005 | 1005 | 1008 | 1005 |
| Quench pressure, kPa | 363 | 501 | 370 | 487 | m = meters;
no. = number;
deg. = degrees;
K. = degrees Kelvin;
Tip(s) 32, 34 = Points 32 or 34 in FIGS. 1 and 2;
cm = centimeters;
Comb. = Combustion;
kPa = kiloPascal;
SCMS = standard cubic meters per second (273 K, 101.3 kPa);
K+ = potassium;
g = grams;
Temp. = Temperature;
s = second(s);
Q = quench;
E(x) = exponential ($10^x$);
NA = not applicable The analytical properties of the carbon blacks produced in Examples 1–33 were analyzed by the procedures described herein. The results are reported in Table 3.

TABLE 3

|  | Example | | | | |
|---|---|---|---|---|---|
|  | 1 | 2 | 3 | 4 | 5 |
| $I_2$ No, mg/g | 120.9 | 117.0 | 104.2 | 89.5 | 91.5 |
| CTAB, m²/g | 108.9 | 105.8 | 98.2 | 87.0 | 88.5 |
| Tol. Extract, % | 100 | 100 | 100 | 100 | 100 |
| Tint, % | 109.4 | 106.4 | 104.4 | 99.8 | 99.5 |
| DBP, cc/100 g | 103.9 | 107.1 | 101.2 | 101.4 | 102.3 |
| CDBP, cc/100 g | 91.8 | 90.7 | 89.0 | 88.9 | 87.9 |
| Dmode, nm | 112 | 117 | 118 | 128 | 123 |
| Dst, nm | 110 | 116 | 116 | 127 | 122 |
| ΔD50, nm | 96 | 101 | 102 | 103 | 101 |
| Particle size, nm | 14.67 | 14.99 | 16.34 | 18.45 | 17.92 |

|  | Example | | | | |
|---|---|---|---|---|---|
|  | 6 | 7 | 8 | 9 | 10 |
| $I_2$ No, mg/g | 98.7 | 85.9 | 96.1 | 85.4 | 72.9 |
| CTAB, m²/g | 88.7 | 78.8 | 87.1 | 79.3 | 79.2 |
| Tol. Extract, % | 100 | 100 | 100 | 100 | 100 |

TABLE 3-continued

|  | | | | |
|---|---|---|---|---|
| Tint, % | 99.1 | 91.6 | 96.6 | 90.3 | 93.6 |
| DBP, cc/100 g | 100.6 | 101.7 | 106.0 | 110.0 | 111.1 |
| CDBP, cc/100 g | 85.6 | 85.7 | 88.6 | 89.9 | 92.2 |
| Dmode, nm | 127 | 136 | 125 | 138 | 129 |
| Dst, nm | 125 | 137 | 125 | 143 | 130 |
| ΔD50, nm | 102 | 110 | 100 | 116 | 107 |
| Particle size, nm | 17.48 | 19.24 | 16.70 | 17.52 | 18.41 |

| | Example | | | |
|---|---|---|---|---|
| | 11 | 12 | 13 | 14 |
| $I_2$ No, mg/g | 125.7 | 85.8 | 90.5 | 89.2 |
| CTAB, m²/g | 98.6 | 77.0 | 76.3 | 75.7 |
| Tol. Extract, % | 100 | 100 | 100 | 100 |
| Tint, % | 105.0 | 88.7 | 91.1 | 90.4 |
| DBP, cc/100 g | 106.0 | 101.0 | 101.1 | 103.7 |
| CDBP, cc/100 g | 89.8 | 84.9 | 85.7 | 85.5 |
| Dmode, nm | NM | NM | NM | NM |
| Dst, nm | NM | NM | NM | NM |
| ΔD50, nm | NM | NM | NM | NM |
| Particle size, nm | 15.07 | 19.64 | 18.99 | 16.74 |

| | Example | | | |
|---|---|---|---|---|
| | 15 | 16 | 17 | 18 |
| $I_2$ No, mg/g | 77.2 | 96.0 | 80.3 | 63.6 |
| CTAB, m²/g | 69.6 | 83.2 | 72.2 | 59.9 |
| Tol. Extract, % | 100 | 73 | 100 | 100 |
| Tint, % | 86.1 | 92.5 | 84.2 | 74.7 |
| DBP, cc/100 g | 158.6 | 161.5 | 163.3 | 162.1 |
| CDBP, cc/100 g | 99.8 | 107.1 | 102.1 | 99.3 |
| Dmode, nm | 122 | 125 | 134 | 135 |
| Dst, nm | 135 | 132 | 146 | 166 |
| ΔD50, nm | 101 | 95 | 106 | 130 |
| Particle size, nm | 29.70 | 16.74 | 23.32 | 33.55 |

| | Example | | | |
|---|---|---|---|---|
| | 19 | 20 | 21 | 22 |
| $I_2$ No, mg/g | 71.3 | 62.5 | 71.2 | 96.2 |
| CTAB, m²/g | 63.5 | 54.8 | 63.5 | 83.6 |
| Tol. Extract, % | 100 | 100 | 95 | 72 |
| Tint, % | 74.1 | 69.6 | 80.0 | 92.2 |
| DBP, cc/100 g | 153.3 | 149.9 | 150.5 | 154.2 |
| CDBP, cc/100 g | 97.5 | 96.1 | 98.8 | 102.8 |
| Dmode, nm | 146 | 152 | 119 | 107 |
| Dst, nm | 177 | 194 | 158 | 135 |
| ΔD50, nm | 151 | 173 | 138 | 116 |
| Particle size, nm | 22.66 | 29.91 | 32.60 | 20.23 |

| | Example | | |
|---|---|---|---|
| | 23 | 24 | 25 |
| $I_2$ No, mg/g | 95.4 | 97.7 | 86.1 |
| CTAB, m²/g | 85.0 | 100.9 | 85.4 |
| Tol. Extract, % | 100 | 66 | 93 |
| Tint, % | 90.5 | 110.0 | 105.1 |
| DBP, cc/100 g | 159.0 | 127.7 | 140.4 |
| CDBP, cc/100 g | 109.7 | 103.2 | 102.0 |
| Dmode, nm | 126 | 98 | 109 |
| Dst, nm | 132 | 99 | 108 |
| ΔD50, nm | 97 | 69 | 71 |
| Particle size, nm | 21.55 | 19.00 | 25.11 |

| | Example | | | |
|---|---|---|---|---|
| | 26 | 27 | 28 | 29 |
| $I_2$ No, mg/g | 58.6 | 69.8 | 71.5 | 80.6 |
| CTAB, m²/g | 63.7 | 75.4 | 76.7 | 79.7 |
| Tol. Extract, % | 82 | 97 | 90 | 100 |
| Tint, % | 79.4 | 106.5 | 105.3 | 104.8 |
| DBP, cc/100 g | 128.5 | 59.4 | 56.8 | 52.2 |
| CDBP, cc/100 g | 100.5 | 57.8 | 56.6 | 52.8 |
| Dmode, nm | 173 | 109 | 105 | 104 |
| Dst, nm | 174 | 112 | 112 | 110 |
| ΔD50, nm | 126 | 108 | 105 | 104 |
| Particle size, nm | 21.44 | 24.34 | 23.41 | 21.88 |

| | Example | | | |
|---|---|---|---|---|
| | 30 | 31 | 32 | 33 |
| $I_2$ No, mg/g | 100.0 | 88.4 | 103.2 | 88.9 |
| CTAB, m²/g | 90.3 | 83.3 | 91.0 | 87.7 |
| Tol. Extract, % | 100 | 98 | 100 | 100 |
| Tint, % | 112.8 | 113.0 | 116.1 | 111.7 |
| DBP, cc/100 g | 77.0 | 75.3 | 67.7 | 68.8 |
| CDBP, cc/100 g | 72.6 | 71.2 | 66.7 | 68.0 |
| Dmode, nm | 91 | 91 | 85 | 88 |
| Dst, nm | 92 | 94 | 87 | 91 |
| ΔD50, nm | 66 | 67 | 61 | 64 |
| Particle size, mn | 23.50 | 24.75 | 22.22 | 22.95 |

Tol. Extract = Toluene Extract Level
NM = not measured

Examples 34–55

The effectiveness and advantages of the carbon blacks and the polymer compositions of the present invention are illustrated by this set of Examples.

Polymer compositions A, B, C, D, E, F, G, H, I, J, K, L, M and N were prepared to evaluate the apparent viscosity, melt flow index and coefficient of absorption properties of polymer compositions incorporating the carbon blacks of Examples 1–14 which include carbon blacks of the present invention and control carbon blacks. Polymer compositions O, P, Q, R, S, T, U and V were prepared to evaluate the apparent viscosity and melt flow index of polymer compositions incorporating the carbon blacks of Examples 26–33 which include carbon blacks of the present invention and control carbon blacks.

Each of the carbon blacks produced in Examples 1–14 and 26–33 was incorporated into polymer compositions at a 35% loading by mass of carbon black into the polymer composition. Polymer compositions A–N were produced utilizing the carbon blacks produced in Examples 1–14. Polymer compositions C, D, E, F, G, H, I and J were polymer compositions of the present invention containing furnace carbon blacks of the present invention, with polymer compositions A and B being the corresponding controls. Polymer compositions L, M and N were also polymer compositions of the present invention containing furnace carbon blacks of the present invention, with polymer composition K being the corresponding control. Polymer compositions O–V were produced utilizing the carbon blacks produced in Examples 26–33. Polymer compositions O, P, Q and R were polymer compositions of the present invention containing furnace carbon blacks of the present invention, with polymer compositions S, T, V and U, respectively, being the corresponding controls.

The polymer compositions A–V were prepared as follows.

Both 420.7 grams carbon black and 781.4 grams linear low density polyethylene (LLDPE) identified as DFDA7510 for carbon blacks from Examples 1 through 14 (polymer compositions A–N) and GRSN7510 for carbon blacks from Examples 26 through 33 (polymer compositions O–V) were charged into a Farrel laboratory Banbury mixer having a mixing chamber with a volume of 1100 cubic centimeters. DFDA7510 polyethylene and GRSN7510 polyethylene are manufactured and sold by Union Carbide. The initial temperature of the mixing step was about 120° F. (322 K), and the mixing was performed for 3 minutes: the first 30 seconds at 77 rpm, the next 45 seconds at 116 rpm, and the remainder of the mixing time at 155 rpm. Following mixing, the product was sheeted off on a two roll mill at 180° F. (355 K) into ⅜ inch (0.0095 m) thick sheets. The sheets were then cut into strips and run through a dicer converting them into cubes of ⅜ inch (0.0095 m) per side. The product was screened to ensure that only uniformly-sized pieces were used for subsequent testing.

The properties of the polymer compositions were evaluated in the manner described above and the results are reported in Table 4. As described above, evaluation of certain properties of the polymer compositions was performed at carbon black loading levels below 35% which were achieved utilizing additional LLDPE.

TABLE 4

| | Example Number | | | | |
|---|---|---|---|---|---|
| | 34 | 35 | 36 | 37 | 38 |
| Polymer Composition | A | B | C | D | E |
| Carbon Black | 1 | 2 | 3 | 4 | 5 |
| Apparent Viscosity, Pa-s, at shear rates of: | | | | | |
| 100 s$^{-1}$ | 2331 | 2342 | 2246 | 2211 | 2257 |
| 300 s$^{-1}$ | 1122 | 1130 | 1083 | 1098 | 1068 |
| 600 s$^{-1}$ | 688 | 696 | 668 | 679 | 679 |
| 1000 s$^{-1}$ | 471 | 478 | 457 | 466 | 466 |
| Melt flow index, g/10 min | 3.12 | 3.17 | 3.40 | 4.18 | 4.29 |
| COA, k Abs Unit/m | 451.4 | 467.7 | 442.4 | 420.7 | 408.4 |

| | Example Number | | | | |
|---|---|---|---|---|---|
| | 39 | 40 | 41 | 42 | 43 |
| Polymer Composition | F | G | H | I | J |
| Carbon Black | 6 | 7 | 8 | 9 | 10 |
| Apparent Viscosity, Pa-s, at shear rates of: | | | | | |
| 100 s$^{-1}$ | 2194 | 2160 | 2246 | 2240 | 2359 |
| 300 s$^{-1}$ | 1070 | 1064 | 1098 | 1104 | 1136 |
| 600 s$^{-1}$ | 663 | 661 | 678 | 689 | 697 |
| 1000 s$^{-1}$ | 457 | 455 | 467 | 473 | 471 |
| Melt flow index, g/10 min | 6.58 | 7.83 | 5.49 | 7.56 | 3.83 |
| COA, k Abs Unit/m | 428.0 | 421.3 | 419.6 | 416.0 | 414.4 |

| | Example Number | | | |
|---|---|---|---|---|
| | 44 | 45 | 46 | 47 |
| Polymer Composition | K | L | M | N |
| Carbon Black | 11 | 12 | 13 | 14 |
| Apparent Viscosity, Pa-s, at shear rates of: | | | | |
| 100 s$^{-1}$ | 2160 | 1966 | 2006 | 2023 |
| 300 s$^{-1}$ | 1058 | 988 | 1001 | 1009 |
| 600 s$^{-1}$ | 656 | 622 | 628 | 633 |
| 1000 s$^{-1}$ | 451 | 429 | 433 | 436 |
| Melt flow index, g/10 min | NM | NM | NM | NM |
| COA, k Abs Unit/m | 427 | 377 | 386 | 370 |

| | Example Number | | | |
|---|---|---|---|---|
| | 48 | 49 | 50 | 51 |
| Polymer Composition | O | P | Q | R |
| Carbon Black | 26 | 27 | 28 | 29 |

TABLE 4-continued

| Apparent Viscosity, Pa-s, at shear rates of: | | | | |
|---|---|---|---|---|
| 100 s$^{-1}$ | 2795 | 2087 | 2201 | 2087 |
| 300 s$^{-1}$ | 1357 | 1001 | 1047 | 998 |
| 600 s$^{-1}$ | 834 | 618 | 647 | 615 |
| 1000 s$^{-1}$ | 546 | 427 | 429 | 409 |
| Melt flow index, g/10 min | 10.80 | 15.90 | 12.56 | 24.54 |
| COA, k Abs Unit/m | NM | NM | NM | NM |

| | Example Number | | | |
|---|---|---|---|---|
| | 52 | 53 | 54 | 55 |
| Polymer Composition | S | T | U | V |
| Carbon Black | 30 | 31 | 32 | 33 |
| Apparent Viscosity, Pa-s, at shear rates of: | | | | |
| 100 s$^{-1}$ | 2236 | 2253 | 2236 | 2279 |
| 300 s$^{-1}$ | 1073 | 1078 | 1073 | 1090 |
| 600 s$^{-1}$ | 660 | 663 | 666 | 677 |
| 1000 s$^{-1}$ | 455 | 459 | 451 | 459 |
| Melt flow index, g/10 min | 11.00 | 8.10 | 11.30 | 6.97 |
| COA, k Abs Unit/m | NM | NM | NM | NM |

Carbon Black = carbon black from example run #;
Pa-s = Pascal seconds
s$^{-1}$ = per second;
g = gram;
min = minute;
k Abs Unit/m = Absorbance units per meter, in thousands
NM = Not Measured The process of manufacture of polymer compositions containing carbon black involves one or more steps of handling a mixture of carbon black and molten polymer. The viscosity of this mixture of carbon black and molten polymer is an important property in determining the ease of its processability. A lower viscosity improves the processability of said mixture of carbon black and molten polymer, and therefore is a particularly important and useful property of such compositions. The data presented in Table 4 clearly show that the polymer compositions C, D, E, F, G, and H of the present invention, containing carbon blacks of the present invention, exhibit a lower apparent viscosity at the shear rates specified, in comparison with the corresponding control polymer compositions A and B. The data presented in Table 4 also show that the polymer compositions L, M and N of the present invention, containing carbon blacks of the present invention, exhibit a lower apparent viscosity at the shear rates specified, in comparison with the corresponding control polymer composition K. Polymer compositions I and J of the present invention exhibit viscosities at the shear rates specified which are comparable to the viscosities of the corresponding control polymer compositions A and B. It is believed the viscosities exhibited by polymer compositions I and J are attributable to the fact that carbon blacks 9 and 10, utilized in polymer compositions I and J respectively, have higher structure levels (as indicated by their DBP values) than control carbon blacks 1 and 2 utilized in polymer compositions A and B respectively.

A higher melt flow index is another indication of the improved processability characteristics of a composition containing a mixture of carbon black and molten polymer, and thus is also a particularly desirable property where improved processability is sought. The data presented in Table 4 clearly show that the polymer compositions C, D, E, F, G, and H of the present invention, containing carbon blacks of the present invention, exhibit higher melt flow indices in comparison with the corresponding control polymer compositions A and B. The data presented in Table 4 also show that the polymer compositions L, M and N of the present invention, containing carbon blacks of the present invention, exhibit higher melt flow indices in comparison with the corresponding control polymer composition K.

Table 4 also provides apparent viscosity and melt flow index data on polymer compositions containing carbon blacks from Examples 26 through 33. As shown in table 4, polymer compositions, P, Q and R comprising carbon blacks of the present invention from Examples 27, 28 and 29 have lower viscosity and higher melt indices in comparison with their respective control compositions T, V and U, incorporating carbon blacks from Examples 31, 33 and 32. The data in Table 4 indicates that the polymer composition containing carbon black from Example 26 exhibits a higher viscosity and approximately an equivalent melt flow index to the polymer composition containing carbon black from Example 30. This result is believed to arise from the significantly higher structure level for the carbon black from Example 26 whose production used a significantly different rate of addition of structure-affecting reagent as compared to carbon black from Example 30.

The coefficient of absorption of a carbon black-containing polymer composition is considered indicative of the degree to which such a composition will tolerate UV exposure with minimal degradation of physical properties. The data presented in Table 4 indicate that polymer compositions C, D, E, F, G, H, I and J of the present invention, containing carbon blacks of the present invention, have coefficients of absorption comparable to the coefficients of absorption of the control polymer compositions A and B. The data presented in Table 4 also indicate that polymer compositions L, M and N of the present invention, containing carbon blacks of the present invention, have coefficients of absorption comparable to the coefficient of absorption of the control polymer composition K.

Examples 56–77

The effectiveness and advantages of the carbon blacks and the polymer compositions of the present invention are also illustrated by this set of Examples.

Polymer compositions AA, BB, CC, DD, EE, FF, GG, HH, II, JJ, KK, LL, MM, NN, OO, PP, QQ, RR, SS, TT, UU, and VV were prepared to evaluate the compound moisture absorption (CMA) properties of polymer compositions incorporating the carbon blacks of the present invention in comparison to polymer compositions incorporating control carbon blacks. Each of the carbon blacks produced in Examples 1–14 and 26–33 was incorporated into polymer compositions. Polymer compositions CC, DD, EE, FF, GG, HH, II and JJ were polymer compositions of the present invention comprising furnace carbon blacks of the present invention from Examples 3–10, with polymer compositions AA and BB being the corresponding controls containing furnace carbon blacks from Examples 1 and 2. Polymer compositions LL, MM and NN were also polymer compositions of the present invention comprising furnace carbon blacks of the present invention from Examples 12, 13 and 14, with polymer composition KK being the corresponding control containing furnace carbon black from Example 10. Polymer compositions OO, PP, QQ and RR were polymer compositions of the present invention comprising furnace carbon blacks of the present invention from Examples 26–29, with polymer compositions SS, TT, VV and UU, respectively, being the corresponding controls containing furnace carbon blacks from Examples 30–33.

The polymer compositions AA–VV were prepared as follows.

The polymer compositions were prepared in a Brabender plasticorder at 100° C. using 35.75 grams of LLDPE, identified as DFDA7510 for carbon blacks from Examples 1 through 14 and GRSN7510 for carbon blacks from Examples 26 through 33 and 19.25 grams carbon black. DFDA7510 polyethylene and GRSN7510 polyethylene are manufactured and sold by Union Carbide. The rotors were turned on to 60 rpm after the desired temperature was reached, and the weighed quantities of polymer and carbon black were charged through the loading chute over a 30 second period. A 10,000 kilogram weight was added to the chute ram, putting the ingredients down to flux. The weights and chute were removed after flux. The rotor speed was adjusted to 60 rpm, the Brabender ram lowered and the compound mixed for five minutes. After this time period was complete, the compound was removed and passed twice through a two-roll mill. The resulting sheets were diced into smaller pieces for CMA testing.

The polymer compositions were evaluated for CMA utilizing the procedures described herein. The results are reported in Table 5.

TABLE 5

| | Example Number | | | | |
|---|---|---|---|---|---|
| | 56 | 57 | 58 | 59 | 60 |
| Polymer Composition | AA | BB | CC | DD | EE |
| Carbon Black | 1 | 2 | 3 | 4 | 5 |
| CMA, % | 0.477 | 0.475 | 0.416 | 0.437 | 0.415 |

| | Example Number | | | | |
|---|---|---|---|---|---|
| | 61 | 62 | 63 | 64 | 65 |
| Polymer Composition | FF | GG | HH | II | JJ |
| Carbon Black | 6 | 7 | 8 | 9 | 10 |
| CMA, % | 0.374 | 0.292 | 0.374 | 0.276 | 0.382 |

| | Example Number | | | |
|---|---|---|---|---|
| | 66 | 67 | 68 | 69 |
| Polymer Composition | KK | LL | MM | NN |
| Carbon Black | 11 | 12 | 13 | 14 |
| CMA, % | 0.465 | 0.243 | 0.288 | 0.265 |

| | Example Number | | | |
|---|---|---|---|---|
| | 70 | 71 | 72 | 73 |
| Polymer Composition | OO | PP | QQ | RR |
| Carbon Black | 26 | 27 | 28 | 29 |
| CMA, % | 0.258 | 0.08 | 0.085 | 0.308 |

| | Example Number | | | |
|---|---|---|---|---|
| | 74 | 75 | 76 | 77 |
| Polymer Composition | SS | TT | UU | VV |
| Carbon Black | 30 | 31 | 32 | 33 |
| CMA, % | 0.513 | 0.385 | 0.485 | 0.086 |

Carbon Black = carbon black from example run #

As indicated previously, the compound moisture absorption (CMA) of a carbon black-containing polymer composition is a particularly important property of such compositions. The data presented in Table 5 clearly show that the polymer compositions CC, DD, EE, FF, GG, HH, II, JJ, LL, MM and NN of the present invention, containing carbon blacks of the present invention exhibit lower CMA values, when compared with the corresponding control polymer compositions AA, BB and KK.

Table 5 also shows CMA values for polymer compositions containing carbon blacks from Examples 26 through 33. For this group of examples when comparing polymer compositions OO, PP, QQ and RR, comprising carbon blacks of the present invention, with their respective controls (polymer compositions SS, TT, VV and UU) one will observe that polymer compositions of the present invention exhibit CMA values that are either lower than or comparable to CMA values of their corresponding controls.

Examples 78 and 79

The effectiveness and advantages of the carbon blacks and polymer compositions of the present invention are further illustrated by the polymer compositions set forth in Examples 78 and 79.

Polymer compositions W and X of the present invention were produced by incorporating the carbon black produced in example run 7 at mass loadings of carbon black into the polymer composition which were greater than 35%. The polymer utilized was LLDPE identified as DFDA 7510 and manufactured and sold by Union Carbide. Table 6 sets forth the actual mass loadings utilized and properties of the polymer compositions which were determined utilizing the procedures described herein.

TABLE 6

|  | Example Number | |
| --- | --- | --- |
|  | 78 | 79 |
| Polymer Composition | W | X |
| Carbon Black | 7 | 7 |
| Carbon black mass loading, % in polymer composition | 38 | 40 |
| Apparent Viscosity, Pa-s, at shear rates of: | | |
| 100 s$^{-1}$ | 2445 | 2707 |
| 300 s$^{-1}$ | 1193 | 1303 |
| 600 s$^{-1}$ | 729 | 784 |
| 1000 s$^{-1}$ | 486 | 517 |
| Melt flow index, g/10 min | 5.30 | 2.98 |

For any two polymer compositions which differ only in the mass loading of carbon black, another mechanism for comparing the processability characteristics of the polymer compositions is to compare the melt flow indices of each polymer composition or, alternatively, the viscosities of each polymer composition when subjected to equal shear rates. The polymer composition exhibiting a lower viscosity or a higher melt flow index, would generally be deemed easier to process.

Extending this argument to any two series of polymer compositions, each made from a different carbon black, and such that the compositions within a particular series contain carbon black with different mass loadings but are otherwise comparable, the series which permits a higher carbon black mass loading for a given melt flow index or viscosity at constant shear rate, will be considered to exhibit an improved processability.

Figure 4:
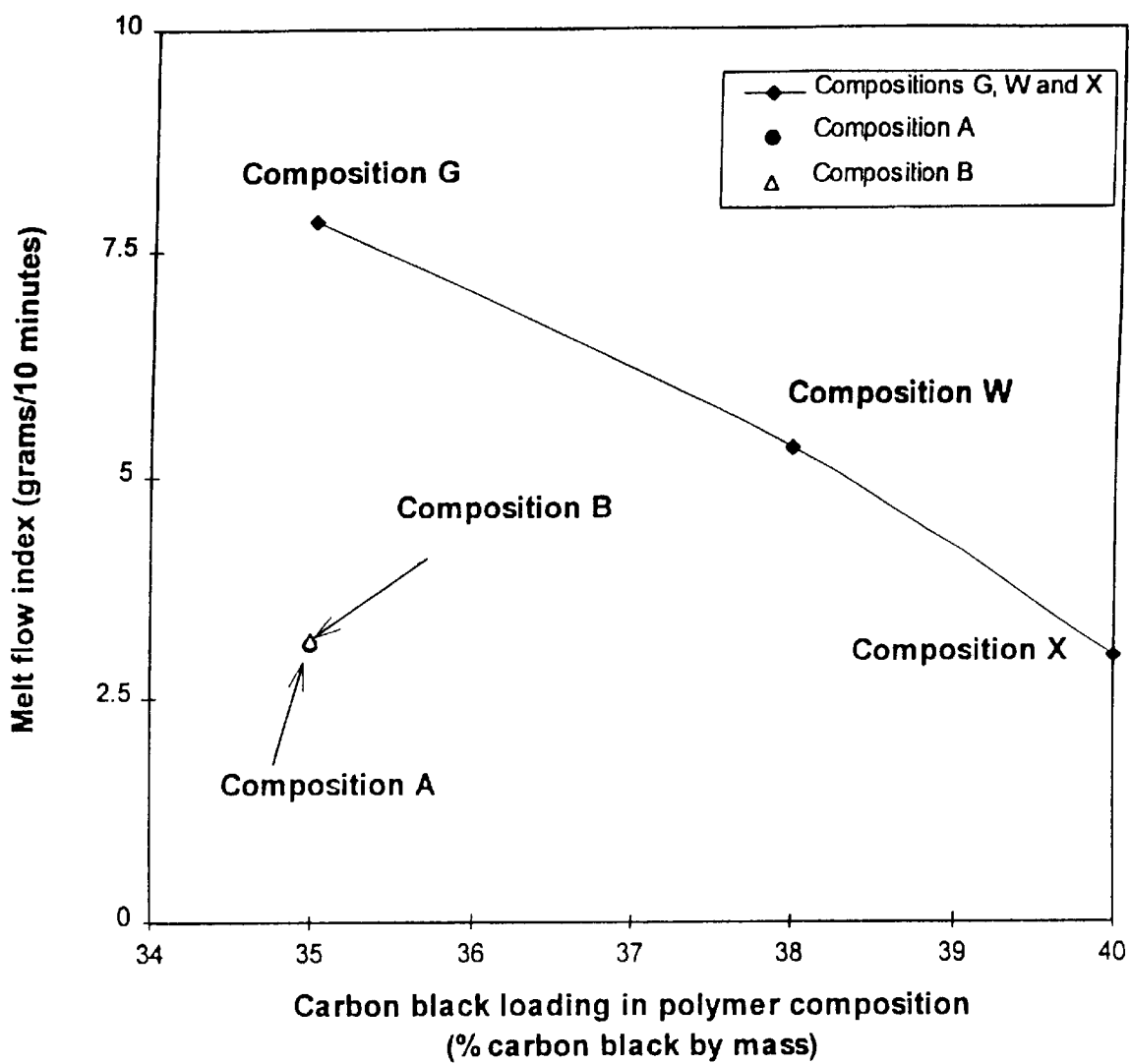
FIG. 4 is a graph illustrating the effect of carbon black loading on the melt flow index of polymer compositions containing carbon blacks of the present invention, along with relevant data for polymer compositions containing control carbon blacks, as described in the Examples herein.
Figure 5:
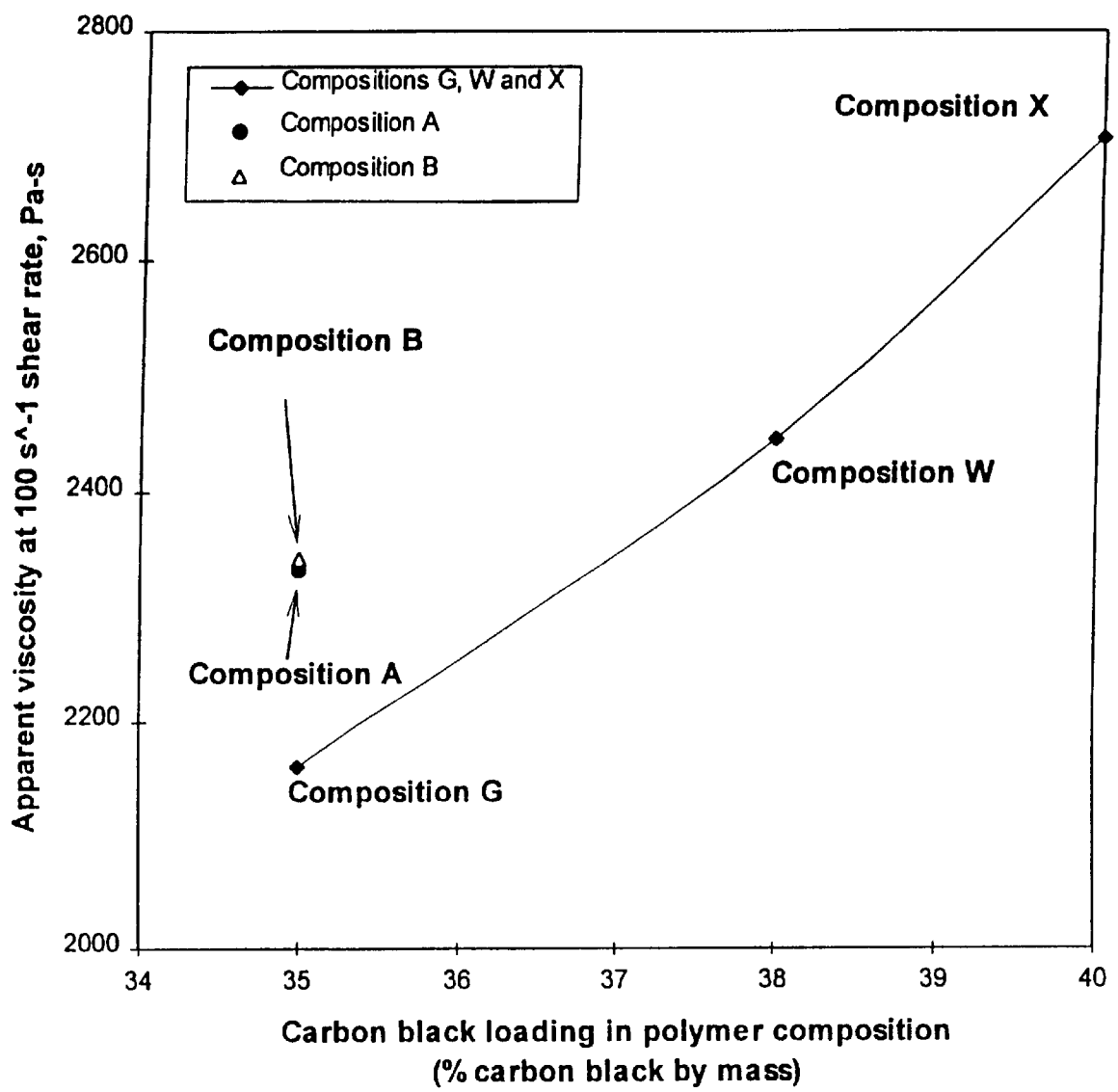
FIG. 5 is a graph illustrating the effect of carbon black loading on the apparent viscosity, at a shear rate of $100 \text{ s}^{-1}$, of polymer compositions containing carbon blacks of the present invention, along with relevant data for polymer compositions containing control carbon blacks, as described in the Examples herein.

The results set forth in FIG. 4 and FIG. 5 show that the carbon blacks of the present invention exhibit improved processability upon incorporation into the polymer compositions described herein for the following reasons:

FIG. 4 depicts the melt flow indices of polymer compositions G, W and X of the present invention incorporating the carbon black of the present invention produced in Example 7 at increasing mass loadings. FIG. 4 also depicts the melt flow indices of control polymer compositions A and B. As set forth above, a melt flow index of a larger magnitude represents a polymer composition of easier processability. Thus, FIG. 4 clearly shows that polymer compositions G, W and X of the present invention incorporate carbon black at mass loadings in excess of those attainable for the incorporation of either of the corresponding control polymer compositions A and B, while still exhibiting substantially the same or higher melt flow index.

In similar fashion, FIG. 5 depicts the apparent viscosities, at a shear rate of 100s$^{-1}$, of polymer compositions G, W and X of the present invention incorporating the carbon black of the present invention produced in example run 7 at increasing mass loadings. FIG. 5 also depicts the apparent viscosities, at a shear rate of 100 s$^{-1}$, of the control polymer compositions A and B. Thus, FIG. 5 clearly shows that polymer compositions G, W and X of the present invention incorporate carbon black at mass loadings in excess of those attainable for the incorporation of either of the corresponding control polymer compositions A and B, while still exhibiting an equivalent or lower apparent viscosity.

It will be clear to one ordinarily skilled in the art that the carbon blacks of the present invention may be utilized at higher loadings than the loadings normally used. Use of the carbon blacks of the present invention at such higher loadings, however, will not result in substantially poorer compound moisture absorption capabilities because of the extent to which the compound moisture absorption capabilities are improved by the carbon blacks of the present invention.

It should be clearly understood that the forms of the invention herein described are illustrative only and are not intended to limit the scope of the invention. The present invention includes all modifications falling within the scope of the following claims.

I claim:

1. A carbon black having: an I$_2$No. of 65–95 mg/g and a primary particle size of less than or equal to 20 nm.

2. The carbon black of claim 1 wherein the I$_2$No. is 73–94 mg/g.

3. The carbon black of claim 2 wherein the I$_2$No. is 85–93 mg/g.

4. The carbon black of claim 1 wherein the primary particle size is less than or equal to 19 nm.

5. The carbon black of claim 2 wherein the primary particle size is less than or equal to 19 nm.

6. The carbon black of claim 3 wherein the primary particle size is less than or equal to 19 nm.

7. A carbon black having an I$_2$No. of 100–112 mg/g and a primary particle size of less than or equal to 20 nm.

8. The carbon black of claim 7 wherein the primary particle size is less than or equal to 19 nm.

9. A carbon black having an I$_2$No. of 65–112 mg/g; a primary particle size of less than or equal to 20 nm; and a CDBP of less than or equal to 102 cc/100 g.

10. The carbon black of claim 9 wherein the CDBP is 70–100 cc/100 g.

11. The carbon black of claim 10 wherein the CDBP is 80–95 cc/100 g.

12. The carbon black of claim 9 wherein the primary particle size is less than or equal to 19 nm.

13. The carbon black of claim 10 wherein the primary particle size is less than or equal to 19 nm.

14. The carbon black of claim 11 wherein the primary particle size is less than or equal to 19 nm.

15. The carbon black of claim 9 wherein the I$_2$No. is 73–104 mg/g.

16. The carbon black of claim 10 wherein the $I_2$No. is 73–104 mg/g.

17. The carbon black of claim 11 wherein the $I_2$No. is 73–104 mg/g.

18. The carbon black of claim 12 wherein the $I_2$No. is 73–104 mg/g.

19. The carbon black of claim 13 wherein the $I_2$No. is 73–104 mg/g.

20. The carbon black of claim 14 wherein the $I_2$No. is 73–104 mg/g.

21. The carbon black of claim 15 wherein the $I_2$No. is 75–99 mg/g.

22. The carbon black of claim 16 wherein the $I_2$No. is 75–99 mg/g.

23. The carbon black of claim 17 wherein the $I_2$No. is 75–99 mg/g.

24. The carbon black of claim 18 wherein the $I_2$No. is 75–99 mg/g.

25. The carbon black of claim 19 wherein the $I_2$No. is 75–99 mg/g.

26. The carbon black of claim 20 wherein the $I_2$No. is 75–99 mg/g.

27. A carbon black having an $I_2$No. of 50–70 mg/g and a primary particle size of less than or equal to 25 nm.

28. The carbon black of claim 27 wherein the primary particle size is from greater than 20 nm to 25 nm.

29. The carbon black of claim 27 wherein the $I_2$No. is 55–65 mg/g.

30. The carbon black of claim 28 wherein the $I_2$No. is 55–65 mg/g.

31. A carbon black having an $I_2$No. of 50–85 mg/g; a primary particle size of less than or equal to 25 nm; and a CDBP of less than or equal to 96 cc/100 g.

32. The carbon black of claim 31 wherein the $I_2$No. is 55–80 mg/g.

33. The carbon black of claim 31 wherein the primary particle size is from greater than 20 nm to 25 nm.

34. The carbon black of claim 31 wherein the CDBP is 50–96 cc/100 g.

35. The carbon black of claim 32 wherein the $I_2$No. is 60–78 mg/g.

36. The carbon black of claim 33 wherein the $I_2$No. is 60–78 mg/g.

37. The carbon black of claim 34 wherein the $I_2$No. is 60–78 mg/g.

38. The carbon black of claim 32 wherein the primary particle size is from greater than 20 nm to 25 nm.

39. The carbon black of claim 34 wherein the primary particle size is from greater than 20 nm to 25 nm.

40. The carbon black of claim 35 wherein the primary particle size is from greater than 20 nm to 25 nm.

41. The carbon black of claim 37 wherein the primary particle size is from greater than 20 nm to 25 nm.

42. The carbon black of claim 33 wherein the CDBP is 50–96 cc/100 g.

43. A polymer composition comprising a polymer and a carbon black having: an $I_2$No. of 65–95 mg/g and a primary particle size of less than or equal to 20 nm.

44. A polymer composition comprising a polymer and a carbon black having an $I_2$No. of 100–112 mg/g and a primary particle size of less than or equal to 20 nm.

45. A polymer composition comprising a polymer and a carbon black having an $I_2$No. of 65–112 mg/g; a primary particle size of less than or equal to 20 nm; and a CDBP of less than or equal to 102 cc/100 g.

46. A polymer composition comprising a polymer and a carbon black having an $I_2$No. of 50–70 mg/g and a primary particle size of less than or equal to 25 nm.

47. A polymer composition comprising a polymer and a carbon black having an $I_2$No. of 50–85 mg/g; a primary particle size of less than or equal to 25 nm; and a CDBP of less than or equal to 96 cc/100 g.

48. The polymer composition of claim 43 wherein the polymer composition comprises 0.5 to 300 parts by weight carbon black per 100 parts by weight of polymer.

49. The polymer composition of claim 44 wherein the polymer composition comprises 0.5 to 300 parts by weight carbon black per 100 parts by weight of polymer.

50. The polymer composition of claim 45 wherein the polymer composition comprises 0.5 to 300 parts by weight carbon black per 100 parts by weight of polymer.

51. The polymer composition of claim 46 wherein the polymer composition comprises 0.5 to 300 parts by weight carbon black per 100 parts by weight of polymer.

52. The polymer composition of claim 47 wherein the polymer composition comprises 0.5 to 300 parts by weight carbon black per 100 parts by weight of polymer.

53. The polymer composition of claim 48 wherein the polymer composition comprises 0.5 to 100 parts by weight carbon black per 100 parts by weight of polymer.

54. The polymer composition of claim 49 wherein the polymer composition comprises 0.5 to 100 parts by weight carbon black per 100 parts by weight of polymer.

55. The polymer composition of claim 50 wherein the polymer composition comprises 0.5 to 100 parts by weight carbon black per 100 parts by weight of polymer.

56. The polymer composition of claim 51 wherein the polymer composition comprises 0.5 to 100 parts by weight carbon black per 100 parts by weight of polymer.

57. The polymer composition of claim 52 wherein the polymer composition comprises 0.5 to 100 parts by weight carbon black per 100 parts by weight of polymer.

58. The polymer composition of claim 53 wherein the polymer composition comprises 0.5 to 80 parts by weight carbon black per 100 parts by weight of polymer.

59. The polymer composition of claim 54 wherein the polymer composition comprises 0.5 to 80 parts by weight carbon black per 100 parts by weight of polymer.

60. The polymer composition of claim 55 wherein the polymer composition comprises 0.5 to 80 parts by weight carbon black per 100 parts by weight of polymer.

61. The polymer composition of claim 56 wherein the polymer composition comprises 0.5 to 80 parts by weight carbon black per 100 parts by weight of polymer.

62. The polymer composition of claim 57 wherein the polymer composition comprises 0.5 to 80 parts by weight carbon black per 100 parts by weight of polymer.

63. The polymer composition of claim 43 wherein the polymer is a polyethylene.

64. The polymer composition of claim 44 wherein the polymer is a polyethylene.

65. The polymer composition of claim 45 wherein the polymer is a polyethylene.

66. The polymer composition of claim 46 wherein the polymer is a polyethylene.

67. The polymer composition of claim 47 wherein the polymer is a polyethylene.

* * * * *